(12) United States Patent
Sun

(10) Patent No.: US 9,814,048 B2
(45) Date of Patent: Nov. 7, 2017

(54) APPARATUS AND METHOD IN WIRELESS COMMUNICATION SYSTEM

(71) Applicant: SONY CORPORATION, Tokyo (JP)

(72) Inventor: Chen Sun, Beijing (CN)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 14/783,006

(22) PCT Filed: May 20, 2014

(86) PCT No.: PCT/CN2014/077853
§ 371 (c)(1),
(2) Date: Oct. 7, 2015

(87) PCT Pub. No.: WO2014/187303
PCT Pub. Date: Nov. 27, 2014

(65) Prior Publication Data
US 2016/0037508 A1 Feb. 4, 2016

(30) Foreign Application Priority Data

May 23, 2013 (CN) .......................... 2013 1 0195210

(51) Int. Cl.
H04W 28/04 (2009.01)
H04W 84/12 (2009.01)
H04W 72/04 (2009.01)
H04W 16/14 (2009.01)

(52) U.S. Cl.
CPC ......... *H04W 72/048* (2013.01); *H04W 16/14* (2013.01)

(58) Field of Classification Search
CPC ..... H04W 28/04; H04W 72/04; H04W 84/12; H04W 84/18; H04W 80/04
See application file for complete search history.

(56) References Cited

U.S. PATENT DOCUMENTS

| 7,873,005 | B2 | 1/2011 | Ahn et al. |
| 7,876,739 | B2 | 1/2011 | Ahn et al. |
| 8,059,597 | B2 | 11/2011 | Park et al. |
| 8,743,797 | B2 | 6/2014 | Park et al. |
| 2004/0203873 | A1* | 10/2004 | Gray ..................... H04W 48/08 455/456.1 |

(Continued)

OTHER PUBLICATIONS

International Search Report dated Sep. 2, 2014, in PCT/CN2014/077853 filed May 20, 2014.

(Continued)

*Primary Examiner* — Andrew Lee
(74) *Attorney, Agent, or Firm* — Oblon, McClelland, Maier & Neustadt, L.L.P.

(57) ABSTRACT

A system and a method in a wireless communication system. The system, includes: circuitry, configured to obtain state information of one or more secondary systems managed by the system in a management region; determine first radio resources of a primary system available for the secondary systems based on the state information and allow the secondary systems to use the first radio resources; identify a change of the state information; determine second radio resources of the primary system available for the secondary systems based on the change; and request the secondary systems to use the second radio resources if the second radio resources is smaller than the first radio resources.

17 Claims, 18 Drawing Sheets

(56) References Cited

U.S. PATENT DOCUMENTS

| | | | |
|---|---|---|---|
| 2011/0119548 A1 | 5/2011 | Imamura et al. | |
| 2011/0200024 A1* | 8/2011 | Karaoguz | H04W 48/10 370/338 |
| 2011/0283287 A1* | 11/2011 | Ha | H04W 72/10 718/103 |
| 2012/0057503 A1* | 3/2012 | Ding | H04W 24/04 370/254 |
| 2012/0201213 A1* | 8/2012 | Banerjea | H04W 72/0453 370/329 |
| 2012/0307744 A1* | 12/2012 | Charbit | H04W 72/1205 370/329 |
| 2012/0307869 A1* | 12/2012 | Charbit | H04B 1/715 375/132 |
| 2012/0322390 A1* | 12/2012 | Muraoka | H04W 16/14 455/67.13 |
| 2013/0028228 A1* | 1/2013 | Nakayama | H04W 16/04 370/329 |
| 2013/0237208 A1* | 9/2013 | Vujcic | H04B 7/15507 455/418 |
| 2013/0316718 A1* | 11/2013 | Hsu | H04W 72/1278 455/450 |
| 2014/0141789 A1* | 5/2014 | Tarokh | H04W 72/02 455/450 |
| 2015/0319731 A1* | 11/2015 | Cui | G01S 5/10 455/456.1 |

OTHER PUBLICATIONS

Written Opinion of the International Searching Authority dated Sep. 2, 2014, in PCT/CN2014/077853 filed May 20, 2014.

* cited by examiner

APPARATUS AND METHOD IN WIRELESS COMMUNICATION SYSTEM

FIELD OF INVENTION

The invention generally relates to the field of wireless communication, and particularly to an apparatus and a method in a wireless transmission system including primary systems and secondary systems.

BACKGROUND OF INVENTION

With the evolution of wireless communication systems, users have increasingly high demands for high quality, high speed and new services. Wireless communication operators and equipment manufacturers need to constantly improve the system to meet the requirements of the users. It takes a lot of spectrum resources (which for example can be quantized with parameters such as time, frequency, bandwidth, and maximum allowable transmit power) to support new services and meet the needs of high-speed communications. Limited spectrum resources have been allocated to the fixed operators and services, and new available spectrums are either very scarce or expensive.

In this case, people propose the concept of dynamic spectrum utilization, i.e. the dynamic use of spectrum resources which have been assigned to some services but not yet fully utilized. For example, spectrums of a channel on which no program is delivered or spectrums of channels adjacent to the channel on the digital television broadcasting spectrum, are dynamically utilized to perform wireless mobile communication, without interfering with the reception of television signals. In this application example, since the television broadcasting spectrum itself is assigned to the television broadcasting system, the television broadcasting system is the primary system and the television is the primary user. In addition, the secondary system is a communication system which uses the spectrum resources of the primary system without interfering with the primary system, such as a wireless access point and wireless devices (such as computers, mobile phones) communicating with the wireless access point. The wireless access point is the manager of the secondary system, so the geographical position of the wireless access point represents the geographical position of the secondary system. Take another example, when a user uses a mobile phone to access the Internet and opens a hotspot function of the mobile phone so that the portable wireless devices, such as tablet computers, laptop computers, can access the Internet via the mobile phone, the position of the mobile phone represents the position of the secondary system. The primary system described herein can refer to a system which has the right to use a spectrum, such as a television broadcasting system; while the secondary system is a system which does not have the right to use the spectrum but can appropriately use the spectrum of the primary system only when the primary system does not use its own spectrum.

In addition, the primary system and the secondary system may be systems each having the right to use the spectrum but having different priority levels in the spectrum utilization. For example, when the operators deploy new base stations to provide new services, the existing base stations and the services provided by the existing base stations have the priority to use the spectrum. The primary system includes a primary user base station and primary users, while the secondary system includes a secondary user base station and secondary users. Communications between the secondary user base station and one or more secondary users or between multiple secondary users can constitute a secondary system. Multiple secondary systems in a certain region can be grouped into a secondary system cluster. For example, a secondary system cluster may include multiple wireless local area networks.

This communication in which the primary system and the secondary system coexist requires that the application of the secondary system should not cause interference to the application of the primary system, or that the impact caused by the spectrum utilization of the secondary system can be controlled within the allowable range of the primary system.

At present, a main way to protect the primary system is to store the coverage information of the primary system into a database. This database also stores interference limits that the primary system can tolerate. Before a secondary system in the same region starts to use the spectrum of a primary system in the same region, the secondary system firstly needs to access this database and submit the state information of the secondary system, such as position information, spectrum emission mask, transmission bandwidth, and carrier frequency. Then, the database calculates the amount of interference to the primary system from the secondary system according to the state information of the secondary system, and calculates the available spectrum resources of the secondary system in the current state according to the amount of interference to the primary system from the secondary system calculated in the current state.

SUMMARY OF INVENTION

However, in the prior art, when the state of a secondary system changes constantly, the available spectrum resource of the secondary system also changes constantly, and therefore the database needs to constantly calculate the new available spectrum resource and send the new available spectrum resource to the secondary system. Then, the secondary system carries out system reconfiguration according to the received new available spectrum resource. Further, when the state of other secondary system changes, for example, when the position of other secondary system, the number of secondary systems which simultaneously use the spectrum resource of the same primary system and/or system parameters of the secondary system change, the available spectrum resource of the secondary system will change, which leads to a result that the secondary system needs to constantly carry out the system reconfiguration. Thus, in the prior art, a large number of information exchanges are required between the secondary system and the database, and the secondary system needs to carry out the system reconfiguration according to the new available spectrum resource for many times. Therefore, the applicant provides the invention based on the above findings. According to the invention, in the case of at least ensuring the performance of the secondary system and ensuring that the protection for the primary system can be achieved at any time, the times of reconfigurations of the secondary system are reduced and the number of formation exchanges between the secondary system and the database is reduced, thereby reasonably utilizing the spectrum resources.

According to an embodiment of the invention, there is provided a system, comprising circuitry, configured to: obtain state information of one or more secondary systems managed by the system in a management region; determine first radio resources of a primary system available for the secondary systems based on the state information and allow the secondary systems to use the first radio resources;

identify a change of the state information; determine second radio resources of the primary system available for the secondary systems based on the change; and request the secondary systems to use the second radio resources if the second radio resources is smaller than the first radio resources.

According to the above system, wherein the circuitry is further configured to not to request the secondary systems to use the second radio resources if the second radio resources is larger than the first radio resources.

According to the above system, wherein the circuitry is further configured to indicate the secondary systems to use the first radio resources if the second radio resources is larger than the first radio resources.

According to the above system, wherein the state information comprises at least one of: location information of the secondary systems, information of the number of secondary systems, and system parameter information of the secondary systems.

According to the above system, wherein the state information of the secondary systems comprises operating regions of the secondary systems, or at least one of a system type, a moving state and an air interface type of the secondary systems, and the circuitry is configured to determine the management region based on the state information.

According to the above system, wherein the circuitry is configured to determine radio resources available to the secondary systems for different positions in the management region, and determine the first radio resources based on the radio resources available to the secondary systems for different positions in the management region.

According to the above system, wherein the system comprises a database.

According to the above system, wherein the system comprises the primary system.

According to another embodiment of the invention, there is provided a method for a system, comprising: obtaining state information of one or more secondary systems managed by the system in a management region; determining first radio resources of a primary system available for the secondary systems based on the state information and allow the secondary systems to use the first radio resources; identifying a change of the state information; determining second radio resources of the primary system available for the secondary systems based on the change; and requesting the secondary systems to use the second radio resources if the second radio resources is smaller than the first radio resources.

According to another embodiment of the invention, there is provided a system, comprising circuitry, configured to: provide state information of the system to a device managing the system; receive first radio resources of a primary system available for the system from the device; receive second radio resources of the primary system available for the system from the device after receiving the first radio resources; use the second radio resources if second radio resources is smaller than the first radio resources.

According to the above system, wherein the circuitry is further configured to not to use the second radio resources if the second radio resources is larger than the first radio resources.

According to the above system, wherein the circuitry is further configured to use the first radio resources if the second radio resources is larger than the first radio resources.

According to the above system, wherein the state information comprises at least one of: location information of the system, information of the on/off state of the system, and system parameter information of the system.

According to the above system, wherein the state information comprises an operating region of the system or at least one of a system type, a moving state and an air interface type of the system.

According to another embodiment of the invention, there is provided a method for a system, comprising: providing state information of the system to a device managing the system; receiving first radio resources of a primary system available for the system from the device; receiving second radio resources of the primary system available for the system from the device after receiving the first radio resources; using the second radio resources if second radio resources is smaller than the first radio resources.

According to another embodiment of the invention, there is provided a non-transient computer readable medium in a system comprising computer-executable instructions for performing steps of: obtaining state information of one or more secondary systems managed by the system in a management region; determining first radio resources of a primary system available for the secondary systems based on the state information and allow the secondary systems to use the first radio resources; identifying a change of the state information; determining second radio resources of the primary system available for the secondary systems based on the change; and requesting the secondary systems to use the second radio resources if the second radio resources is smaller than the first radio resources.

According to another embodiment of the invention, there is provided a non-transient computer readable medium in a system comprising computer-executable instructions for performing steps of: providing state information of the system to a device managing the system; receiving first radio resources of a primary system available for the system from the device; receiving second radio resources of the primary system available for the system from the device after receiving the first radio resources; using the second radio resources if second radio resources is smaller than the first radio resources.

With the invention, at least in the case of ensuring the performance of the secondary system and ensuring that the protection for the primary system can be achieved at any time, the times of reconfigurations of the secondary system are reduced and/or the number of information exchanges between the secondary system and the database is reduced, thereby reasonably utilizing the spectrum resources.

BRIEF DESCRIPTION OF THE DRAWINGS

The above and other objects, features and advantages of the invention will be readily understood with reference to illustrations to the embodiments of the invention in junction with the drawings. In the drawings, the same or corresponding technical features or components will have the same or corresponding reference numerals.

DESCRIPTION OF THE EMBODIMENTS

Figure 1:
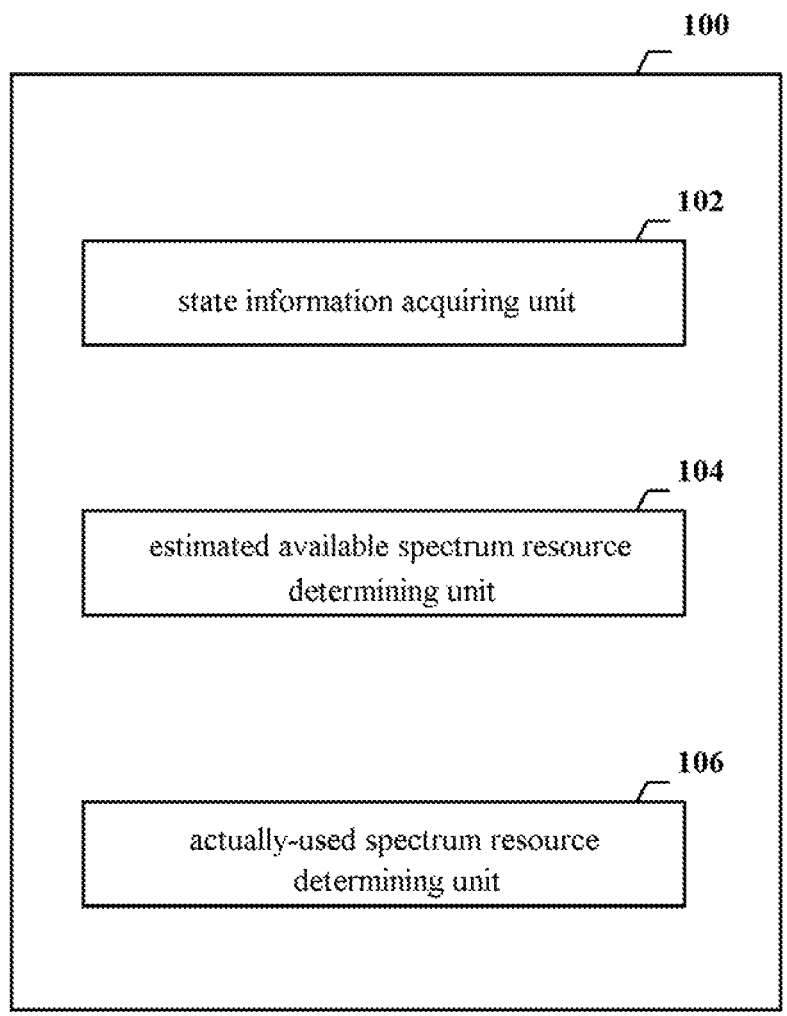
FIG. 1 is a block diagram illustrating the configuration of an apparatus in a wireless communication system according to an embodiment of the invention.

Embodiments of the invention will be described below with reference to the drawings. It should be noted that, for the purpose of clarity, representations and descriptions for components and processes that are irrelevant to the invention and known to those skilled in the art are omitted in the drawings and the specification.

The configuration of an apparatus in a wireless communication system according to an embodiment of the invention will be described below with reference to FIG. 1. FIG. 1 is a block diagram illustrating the configuration of the apparatus in a wireless communication system according to the embodiment of the invention.

As shown in FIG. 1, the apparatus 100 in a wireless communication system may include a state information acquiring unit 102, an estimated available spectrum resource determining unit 104 and an actually-used spectrum resource determining unit 106.

The state information acquiring unit 102 can acquire the state information of at least one of the secondary systems in a predetermined management region when the state of at least one of the secondary systems in the predetermined management region changes.

As described above, multiple secondary systems can exist simultaneously in the service range of a primary system. That is, the primary system and multiple secondary systems can coexist.

Figure 2:
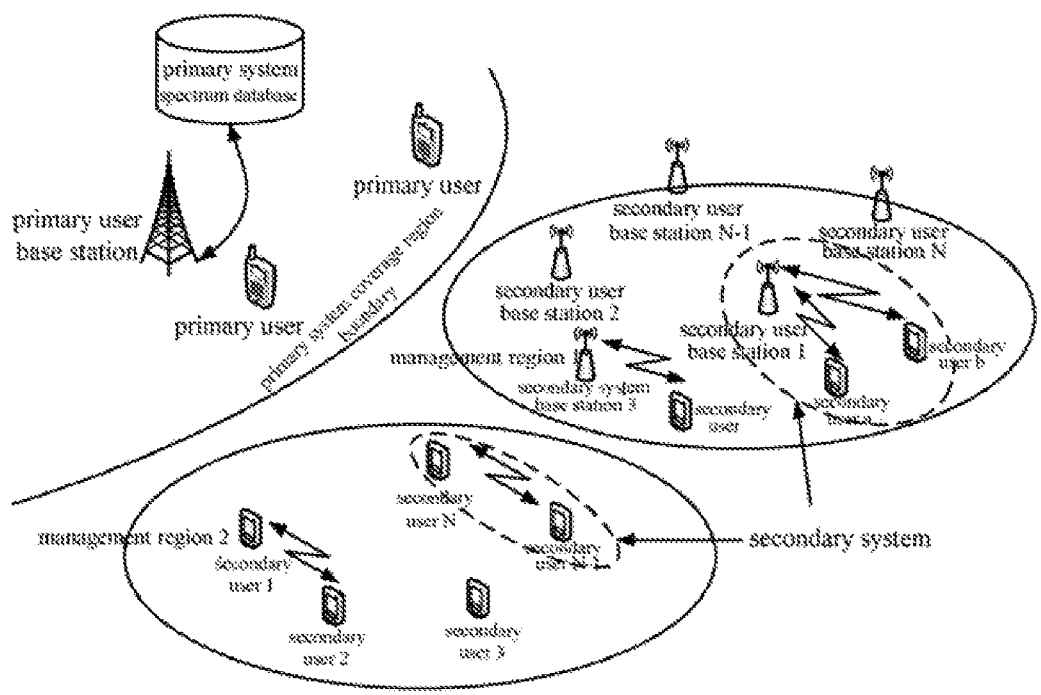
FIG. 2 is a schematic diagram illustrating a coexist scene of a primary system and multiple secondary systems according to an embodiment of the invention.

A coexist scene of a primary system and multiple secondary systems is described below with reference to FIG. 2. FIG. 2 is a schematic diagram illustrating a coexist scene of a primary system and multiple secondary systems according to an embodiment of the invention.

As shown in FIG. 2, primary users and a primary user base station together form a primary system, and the spectrum resource information of the primary system can be stored in a primary system spectrum database. Further, as shown in FIG. 2, a secondary user base station and secondary users thereof together form a secondary system, for example a secondary user base station 1 and a secondary user a and a secondary user b thereof together form one secondary system. Further, as shown in FIG. 2, several secondary users can together form a secondary system, for example a secondary user N and a secondary user N−1 together form another secondary system. Several secondary systems can be grouped into a same management region, for example, several secondary systems adjacent from each other can be grouped into a same management region. For example, as shown in FIG. 2, several secondary systems composed of secondary user base stations 1, 2, 3, . . . , N and secondary users thereof can be grouped into a management region 1, and several secondary systems composed of the secondary users can be grouped into a management region 2.

According to a specific embodiment of the invention, the state information includes at least one of: position information of the secondary system, information of the number of secondary systems and system parameter information of the secondary system.

As the primary system and the secondary systems coexist, the secondary system will cause interference to the primary system. In addition, secondary systems may also interference with each other. Moreover, the state of the secondary system may change, for example, when a secondary system is moved, the position information of the secondary system will change; as another example, when a secondary system joins in or exits from a management region, information of the number of secondary systems will change; as another example, the system parameters of the secondary system will also change, and so on. Thus, when the state of the secondary system changes, the amount of interference to the primary system from the secondary system and the amount of interference to other secondary systems from the secondary system will change accordingly.

Referring back to FIG. 1, the estimated available spectrum resource determining unit 104 in the apparatus 100 can determine an estimated available spectrum resource of the secondary system according to the state information such that interference to the primary system from the secondary system does not exceed a predetermined range when the secondary system works in the range of the estimated available spectrum resource.

The estimated available spectrum resource of the secondary system is the maximum transmit power and bandwidth of the secondary system allowed in the case that the secondary system does not interfere with the primary system or the caused interference does not exceed a predetermined range. When the state of the secondary system changes, it is required to determine the estimated available spectrum resource of the secondary system according to the state information of the secondary system that has changed.

For example, the state information of the secondary system may be position information of the secondary system. Due to the path fading of the wireless signal transmission, the estimated available spectrum resource of the secondary system is affected by the distance between the secondary system and the primary system or other factors. The distance between the secondary system and the primary system can be determined according to the position information of the secondary system and the service range information of the primary system. Thus, the estimated available spectrum resource of the secondary system can be determined according to the determined distance between the secondary system and the primary system.

As another example, the state information of the secondary system may be information of the number of secondary systems which simultaneously use the spectrum resource of the primary system. When a secondary system joins in or exits from a management region, the information of the number of secondary systems will change, and also the aggregated interference to the primary system caused by multiple secondary systems which simultaneously use the spectrum resource of the primary system will change. Therefore, the estimated available spectrum resource of the secondary system can also be determined according to the aggregated interference to the primary system caused by multiple secondary systems which simultaneously use the spectrum resource of the primary system.

As another example, the state information of the secondary system may be system parameter information of the secondary system. The system parameter information of the secondary system may be an antenna or a transmission template or the like used by the secondary system. When the system parameters of the secondary system change, the interference to the primary system from the secondary system will also change. Therefore, the estimated available spectrum resource of the secondary system can also be determined according to the system parameter information of the secondary system.

It should be understood by those skilled in the art that the estimated available spectrum resource of the secondary system can also be determined according to any combination of the information of the three states described above. According to an embodiment of the invention, the estimated available spectrum resource of the secondary system includes at least one of: spectrum band, bandwidth, transmission power and spectrum utilization time. Specifically, the estimated available spectrum resource of the secondary system includes at least one of: available spectrum band, available bandwidth, maximum transmission power and spectrum utilization valid time. Furthermore, those skilled in the art will understand that the estimated available spectrum resources described above are only illustrative, not exhaustive.

The estimated available spectrum resource determining unit 104 can monitor the state of the secondary system, for example, can check the number of active secondary systems, or can receive the position information from the secondary system. When the state of at least one of the secondary systems in the management region changes, for example, when the position or number of a certain secondary system or other secondary systems which are adjacent to the secondary system and simultaneously use the spectrum resource of the primary system changes, the estimated available spectrum resource determining unit 104 recalculates the estimated available spectrum resource of each secondary system according to the current states of all the secondary systems in the management region. Those skilled in the art should understand that various methods can be used to calculate the estimated available spectrum resource of the secondary system. For example, The EEC 186 method recorded in reference 1 (CEPT, "Technical and Operational Requirements for the Operation of White Space Devices under Geo-location Approach", ECC 186, January 2013) can be used to calculate the estimated available spectrum resource of the secondary system.

Referring back to FIG. 1, the actually-used spectrum resource determining unit 106 in the apparatus 100 can compare the estimated available spectrum resource with an initial available spectrum resource before the changing of the state of at least one of the secondary systems, and determine an actually-used spectrum resource of the secondary system according to the comparison result.

The initial available spectrum resource for a secondary system may be a default available spectrum resource, which can be calculated according to a predetermined coexist model of the primary system and the secondary systems. Hereinafter, detailed description is made regarding how to calculate the initial available spectrum resource for a secondary system according to the predetermined coexist model of a primary system and secondary systems. The initial available spectrum resource for a secondary system can be firstly informed to each secondary system entering into the management region, for example, after entering into the management region, the secondary system can receive the initial available spectrum resource for a secondary system from the primary system. However, the secondary system does not directly use the initial available spectrum resource describe above, but uses the initial available spectrum resource as an reference value, and compares the estimated available spectrum resource calculated according to the state information of the secondary system with the initial available spectrum resource used as the reference value, thus determines, according to the comparison result, whether to use the initial available spectrum resource or the estimated available spectrum resource calculated according to the state information of the secondary system as the actual spectrum resource.

According to a specific embodiment of the invention, the actually-used spectrum resource determining unit 106 can also instruct the secondary system to use the initial available spectrum resource as the actually-used spectrum resource or give no instruction if the estimated available spectrum resource is greater than or equal to the initial available spectrum resource. According to a specific embodiment of the invention, the actually-used spectrum resource determining unit 106 can also send the estimated available spectrum resource to the secondary system if the estimated available spectrum resource is less than the initial available spectrum resource, so that the secondary system uses the estimated available spectrum resource as the actually-used spectrum resource.

When the calculated estimated available spectrum resource is greater than or equal to the initial available spectrum resource, it is possible to instruct the secondary system to use the initial available spectrum resource as the actually-used spectrum resource in order to protect the primary system from interference as much as possible. For example, at this time, the primary system can send a confirmation message to the secondary system to explicitly instruct the secondary system to use the initial available spectrum resource. As another example, at this time, the primary system can send no message to the secondary system, so the secondary system can continue using the initial available spectrum resource by default.

When the calculated estimated available spectrum resource is less than the initial available spectrum resource, it indicates that the secondary system will interfere with the primary system if the secondary system continues using the initial available spectrum resource. Therefore, in this case, the primary system can send the calculated estimated available spectrum resource to the secondary system so that the secondary system can use the calculated estimated available spectrum resource as the actually-used spectrum resource.

Thus, according to the embodiment of the invention, only in the case that the calculated estimated available spectrum resource is less than the initial available spectrum resource, the actually-used spectrum resource of the secondary system needs to be adjusted, i.e. there is a need to perform the reconfiguration of the secondary system. In contrast, in the case that the calculated estimated available spectrum resource is greater than or equal to the initial available spectrum resource, the actually-used spectrum resource of the secondary system does not need to be adjusted, i.e. there is no need to perform the reconfiguration of the secondary system. Therefore, according to the invention, it is possible to reduce the times of reconfigurations of the secondary system and/or reduce the number of information exchanges between the secondary system and the database at least in the case of ensuring the performance of the secondary system and ensuring that the protection for the primary system can be achieved at any time.

Figure 3:
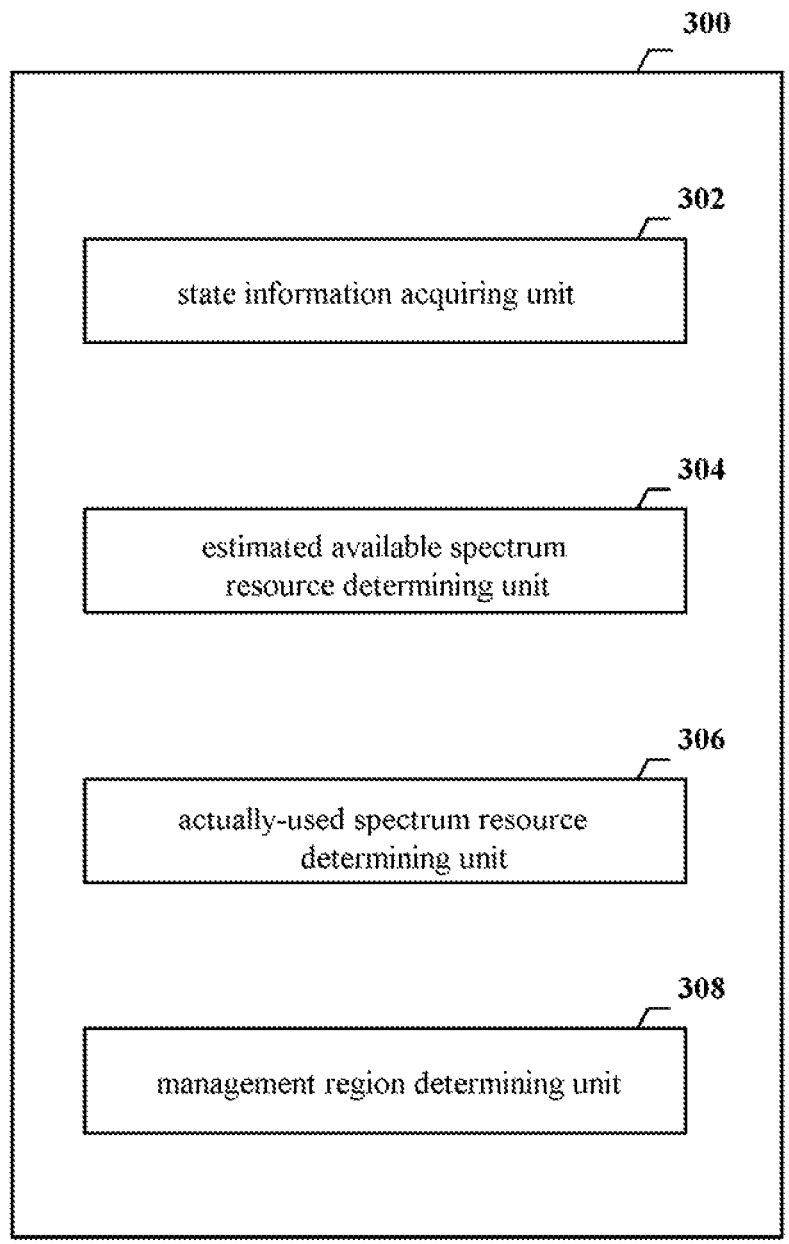
FIG. 3 is a block diagram illustrating the configuration of an apparatus in a wireless communication system according to another embodiment of the invention.

The configuration of an apparatus in a wireless communication system according to another embodiment of the invention is described below with reference to FIG. 3. FIG. 3 is a block diagram illustrating the configuration of the apparatus in a wireless communication system according to another embodiment of the invention.

As shown in FIG. 3, the apparatus 300 in a wireless communication system includes a state information acquiring unit 302, an estimated available spectrum resource determining unit 304, an actually-used spectrum resource determining unit 306 and a management region determining unit 308. Wherein the configurations of the state information acquiring unit 302, the estimated available spectrum resource determining unit 304 and the actually-used spectrum resource determining unit 306 are respectively the same as that of the state information acquiring unit 102, the estimated available spectrum resource determining unit 104 and the actually-used spectrum resource determining unit 106 in the apparatus 100 shown in FIG. 1, so the specific details will not be described here. The management region determining unit 308 in the apparatus 300 is described below in detail.

As shown in FIG. 3, the management region determining unit 308 in the apparatus 300 in a wireless communication system can acquire an expected management range of the secondary system where the secondary system expects to use spectrum resources in a predetermined time period, and determine the management region according to the expected management range, wherein the expected management range is determined by the secondary system according to the application and a predetermined moving direction of the secondary system or according to a normal moving range of the secondary system.

The management region is an activity range of one or more secondary systems. For example, see FIG. 2, the management region 1 is an activity range of several secondary systems composed of secondary user base stations 1, 2, 3, . . . , N and secondary users thereof, while the management region 2 is an activity range of several secondary systems composed of secondary users. The primary system can manage the spectrum resource utilization situation within this activity range of secondary systems in the management region. In addition, different spectrum resource management strategies can be used for different management regions.

The management region determining unit 308 can acquire an expected management range of the secondary system where the secondary system expects to use spectrum resources in a predetermined time period, and determine the management region according to the expected management range. Specifically, the secondary system can determine the expected management range described above according to the application and a predetermined moving direction of the secondary system or according to a normal moving range of the secondary system. In addition, the secondary system can submit the determined expected management range to the primary system, and the primary system can determine the management region according to the expected management range acquired from the secondary system. For example, when people go to work in workdays, their activity range is usually limited to the office and its surrounding regions. Therefore, the office and its surrounding regions are the expected management range of the secondary system where the secondary system expects to use spectrum resources in workdays, and thus the secondary system can submit the office and its surrounding regions to the primary system, and the primary system can set the office and its surrounding regions acquired from the secondary system as the management region. It should be understood by those skilled in the art that, various ways can be adopted to describe the management region. For example, an address can be used to describe the management region, and center coordinates and radius can also be used to describe the management region.

According to a specific embodiment of the invention, the management region determining unit 308 in the apparatus 300 can also determine the management region according to at least one of a system type, a moving state and an air interface type of the secondary system.

The secondary systems can also submit at least one of the system type, the moving state and the air interface type of the secondary system to the primary system, and the primary system can determine the management region according to at least one of the system type, the moving state and the air interface type of the secondary system acquired from the secondary system. For example, the system type of the secondary system may be micro base station, pico base station, home base station, remote radio unit or relay base station and so on. For example, the moving state of the secondary system may include for example a low-speed moving state of a pedestrian, a medium-speed moving state of a vehicle or a high-speed moving state of a train. For example, the air interface type of the secondary system may be CDMA, LTE or GSM and so on.

It should be understood by those skilled in the art that, the primary system can determine the management region according to a combination of various information submitted by the secondary system, such as the expected management range of the secondary system, the system type of the secondary system, the moving state of the secondary system and the air interface type of the secondary system. In addition, the primary system can determine the management region according to the various information described above which is submitted by one or more secondary systems or any combination thereof. The management region can cover multiple secondary systems with the same type or the same moving state. After the management region is determined in this way, a corresponding model can be established for the spectrum resource utilization situation and the system performance of secondary systems in the management region, and the management region is managed according to the established corresponding model.

Figure 4:
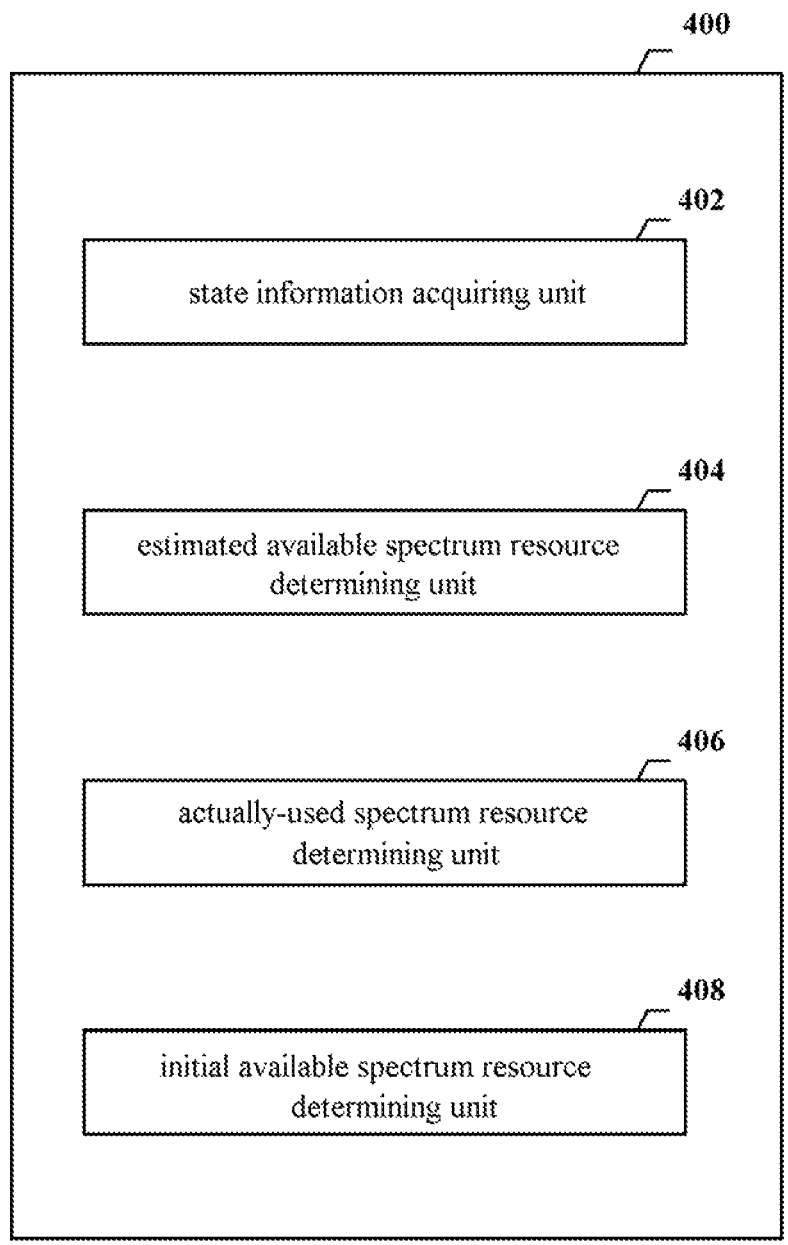
FIG. 4 is a block diagram illustrating the configuration of an apparatus in a wireless communication system according to another embodiment of the invention.

The configuration of an apparatus in a wireless communication system according to another embodiment of the invention is described below with reference to FIG. 4. FIG. 4 is a block diagram illustrating the configuration of the apparatus in a wireless communication system according to another embodiment of the invention.

As shown in FIG. 4, the apparatus 400 in a wireless communication system includes a state information acquiring unit 402, an estimated available spectrum resource determining unit 404, an actually-used spectrum resource determining unit 406 and an initial available spectrum resource determining unit 408. Wherein, the configurations of the state information acquiring unit 402, the estimated available spectrum resource determining unit 404 and the actually-used spectrum resource determining unit 406 are respectively the same as that of the state information acquiring unit 102, the estimated available spectrum resource determining unit 104 and the actually-used spectrum resource determining unit 106 in the apparatus 100 shown in FIG. 1, so the specific details will not be described here. The initial available spectrum resource determining unit 408 in the apparatus 400 is described below in detail.

As shown in FIG. 4, the initial available spectrum resource determining unit 408 in the apparatus 400 in a wireless communication system can determine, according to information of the secondary system and the primary system, respective estimated available spectrum resources of each secondary system in the management region at respective positions in the management region and determine the initial available spectrum resource according to the respective estimated available spectrum resources at different positions.

After the management region and the number of secondary systems in the management region are determined, a corresponding model can be established for the spectrum resource utilization situation and the system performance of secondary systems in the management region, and the management region is managed according to the established corresponding model.

Figure 5:
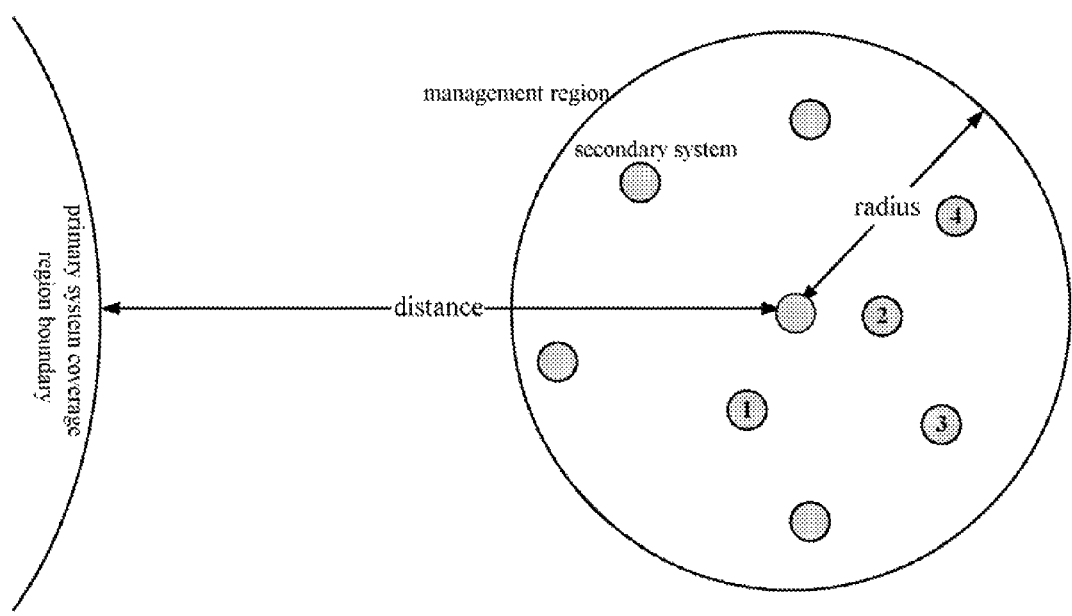
FIG. 5 is a schematic diagram of a model for simulating a primary system and secondary systems in a management region according to an embodiment of the invention.

A model for simulating the primary system and secondary systems in the management region according to an embodiment of the invention is described below with reference to FIG. 5. FIG. 5 is a block diagram illustrating the model for simulating the primary system and secondary systems in the management region according to an embodiment of the invention.

As shown in FIG. 5, the center coordinates and radius can be used to describe the management region, and a small circle in the management region can be used to represent a secondary system in the management region. The transmission model and path loss between the secondary systems and the transmission model and path loss from the secondary systems to the service range of the primary system may be prior knowledge acquired by accessing a database, or may be the transmission model and path loss determined according to the actual environment. The primary system can generate the state of a secondary system in the management region at any time, such as the number of secondary systems in the management region and the position of each secondary system, according to the position information submitted by the secondary system and the statistical distribution of the number of secondary systems activated in a predetermined time period, by using the model shown in FIG. 5.

When the positions of one or more secondary systems in the management region are given, the respective estimated available spectrum resource of each secondary system in the management region at the respective positions in the management region can be determined according to the information of the secondary system and the primary system by using various methods. For example, the reference 1 (CEPT, "Technical and Operational Requirements for the Operation of White Space Devices under Geo-location Approach", ECC 186, January 2013) proposes a calculation method of the estimated available spectrum resource, such that in the case that the positions of one or more secondary systems have been given, interference to the primary system from these secondary systems does not exceed a predetermined range. For the states of the secondary systems in the management region at any time generated by the model shown in FIG. 5, the calculation method recorded in the reference 1 can be used to calculate the respective estimated available spectrum resource of each secondary system at respective positions in the management region at the current time.

As described above, the state information of the secondary system includes at least one of: position information of the secondary system, the information of the number of secondary systems and system parameter information of the secondary system. In the following, the position information of the secondary system is taken as an example to illustrate, but this is only illustrative and not restrictive, and in the case of using other state information or a combination thereof, the calculation method is similar.

As shown in FIG. 5, assuming that a distance from the management region to the boundary of the service region of the primary system is 20 km, the radius of the management region is 10 km, there are four secondary systems 1, 2, 3, 4 moving randomly in the management region, and the four secondary systems simultaneously use the spectrum resource of the primary system. The respective positions of the respective secondary systems in the management region can be generated for many times, and the estimated available spectrum resource of each secondary system at respective positions in the management region can be calculated.

According to a specific embodiment of the invention, the initial available spectrum resource determining unit 408 in the apparatus 400 can calculate the average of the respective estimated available spectrum resources at respective positions as the initial available spectrum resource.

Specifically, the primary system can select the average value or extreme value (maximum or minimum) of the respective estimated available spectrum resources at respective positions as the initial available spectrum resource. Further, the primary system can also select a corresponding value according to history information of the spectrum resource obtained by the secondary system in a predetermined time period as the initial available spectrum resource.

According to a specific embodiment of the invention, the initial available spectrum resource determining unit 408 in apparatus 400 can also count the distribution probability of the respective estimated available spectrum resources at respective positions and the channel capacity when the estimated available spectrum resource under a corresponding distribution probability is adopted, and determine the initial available spectrum resource according to the count result.

According to this embodiment, the initial available spectrum resource of the secondary system can be determined by considering the compromise between the reconfiguration complexity of the secondary system and the channel capacity of the secondary system. For example, the primary system can determine the initial available spectrum resource of the secondary system according to the distribution probability of the respective estimated available spectrum resources of the secondary system at respective positions in the management region and the channel capacity when the estimated available spectrum resource under a corresponding distribution probability is adopted.

Figure 6:
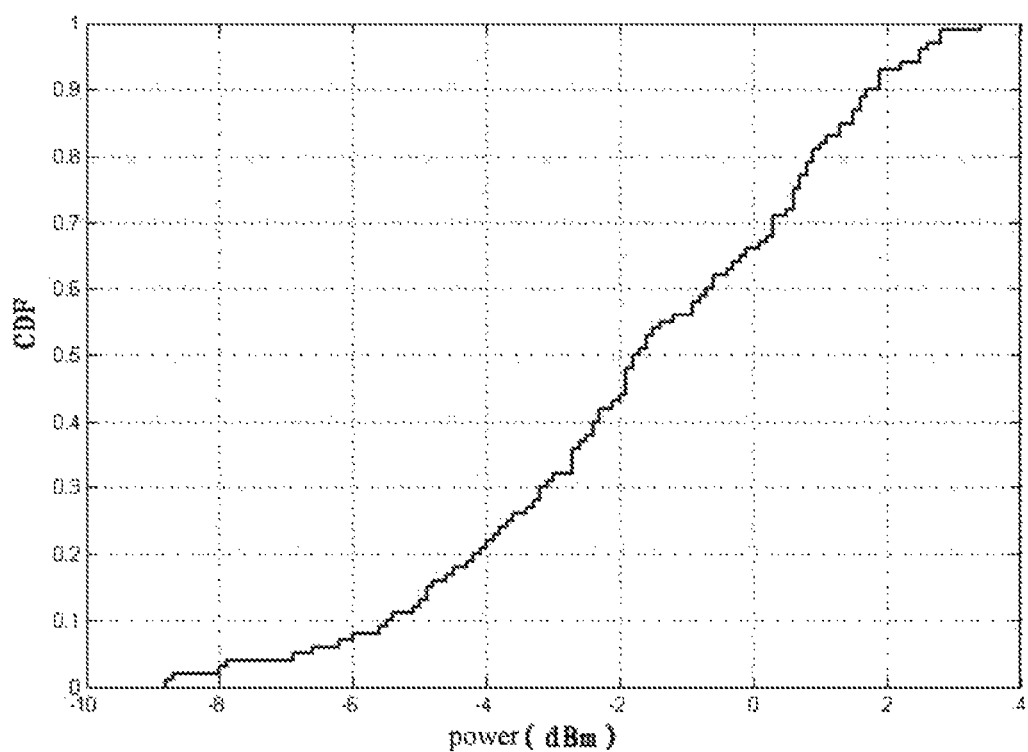
FIG. 6 is a graph illustrating the distribution probability of the estimated available spectrum resource of a secondary system at multiple positions in the management region according to an embodiment of the invention.
Figure 7:
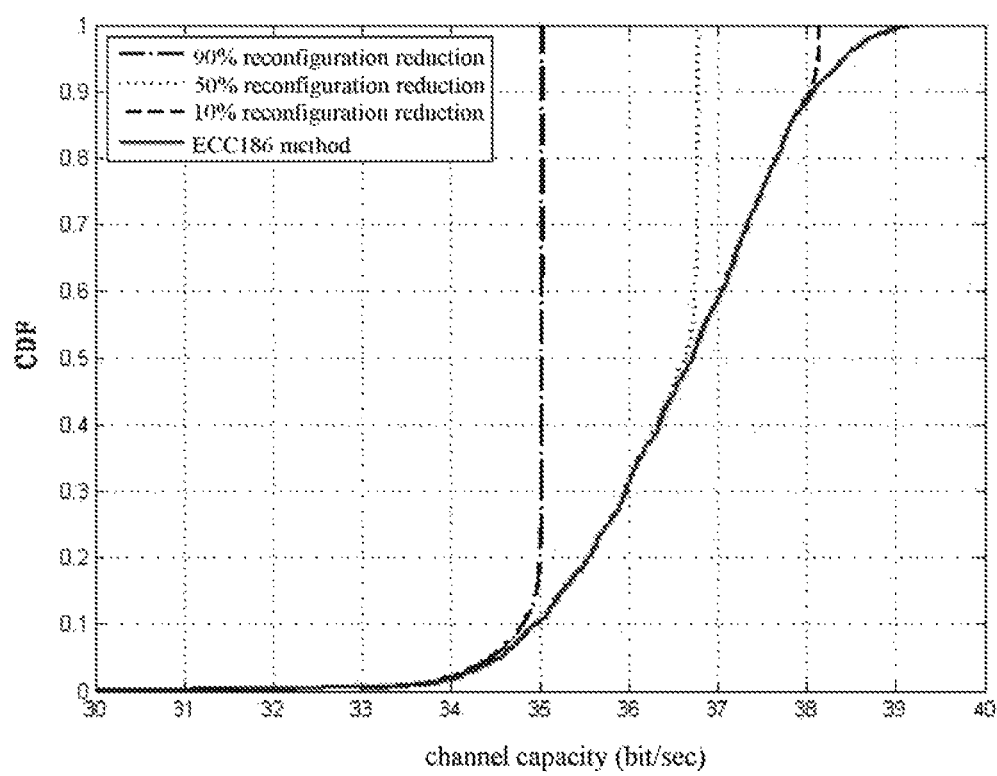
FIG. 7 is a graph illustrating the cannel capacity when the secondary system adopts the estimated available spectrum resource under a corresponding distribution probability, according to an embodiment of the invention.

In the following, the process of determining the initial available spectrum resource of the secondary system according to the distribution probability of the respective estimated available spectrum resources of the secondary system at respective positions in the management region and the channel capacity when the estimated available spectrum resource under a corresponding distribution probability is adopted is described with reference to FIG. 6 and FIG. 7. FIG. 6 is a graph illustrating the distribution probability of the estimated available spectrum resources of the secondary system at multiple positions in the management region according to an embodiment of the invention. FIG. 7 is a graph illustrating the channel capacity of the secondary system when the secondary system adopts the estimated available spectrum resources under a corresponding distribution probability according to an embodiment of the invention.

According to a specific embodiment of the invention, the primary system can calculate, according to the state information of the secondary system, the distribution probability of the estimated available spectrum resource of the secondary system in the process that the state of the secondary system changes constantly in the management region, and the primary system can extract the estimated available spectrum resource under different distribution probabilities from the calculated distribution probability.

As shown in FIG. 6, FIG. 6 shows the distribution probability of the estimated available spectrum resource of the secondary system at multiple positions in the management region. The horizontal axis in FIG. 6 represents the estimated available spectrum resource of the secondary system at multiple positions in the management region, which is represented with power (in dBm); the vertical axis in FIG. 6 represents the distribution probability of the estimated available spectrum resource of the secondary system at multiple positions in the management region. Continuing the above example, FIG. 6 shows a case that when the positions of the four secondary systems in the management region change randomly, the estimated available spectrum resource of each secondary system changes as the position of the secondary system in the management region changes. For example, as shown in FIG. 6, the probability that the estimated available spectrum resource (indicated by power in this embodiment) of the respective secondary systems in the management region is less than −5.5 dBm is 10%; the probability that the estimated available spectrum resource (indicated by power in this embodiment) of the respective secondary systems in the management region is less than −1.9 dBm is 50%; and the probability that the estimated available spectrum resource (indicated by power in this embodiment) of the respective secondary systems in the management region is less than 2 dBm is 90%.

According to a specific embodiment of the invention, the primary system can calculate, according to the estimated available spectrum resource under different distribution probabilities, the channel capacity of the secondary system in the process that the state of the secondary system changes constantly in the management region.

As shown in FIG. 7, FIG. 7 illustrates a channel capacity of the secondary system when the secondary system adopts the estimated available spectrum resource under a corresponding distribution probability. The vertical axis in FIG. 7 represents the distribution probability of the adopted estimated available spectrum resource; the horizontal axis in FIG. 7 represents the channel capacity when the estimated available spectrum resource under a corresponding distribution probability is adopted, which represents data transmission rate (in bits/sec). As shown in FIG. 7, a curve labeled "ECC 186 method" indicates the channel capacity of the secondary system when the secondary system is located at any position in the management region, in that case where the secondary system adopts the estimated available spectrum resource calculated according to the calculation method in the reference 1. And a curve labeled "x % reconfiguration reduction" indicates the channel capacity of the secondary system when the secondary system is located at any position in the management region, in the case where the secondary system adopts the estimated available spectrum resource under a corresponding distribution probability x %.

According to a specific embodiment of the invention, for different probability distributions, the loss amount of the channel capacity when using the estimated available spectrum resource calculated according to the calculation method in the reference 1 can be compared with the loss amount of the channel capacity when using the estimated available spectrum resource under a corresponding distribution probability. Then, a compromise is made between the loss of the channel capacity of the secondary system and the reconfiguration complexity of the secondary system, thus an optimal value can be selected according to actual requirements.

As shown in FIG. 7, if the estimated available spectrum resource under a distribution probability of 10% is adopted, 90% of the channel capacity of the secondary systems is reduced by 2 bit/sec compared with the case in which the calculation method described in reference 1 is adopted. Also, if the estimated available spectrum resource under a distribution probability of 50% is adopted, 90% of the channel capacity of the secondary systems is reduced by 1 bit/sec compared with the case in which the calculation method described in the reference 1 is adopted. Thus, if the estimated available spectrum resource under the distribution probability of 50% is adopted, then in the case that the loss of channel capacity in small, only 50% of situations need to reduce the estimated available frequency spectrum resource of the secondary system during the constantly changing of the position of the secondary system, and thus the reconfiguration complexity of the secondary system is reduced by half. Thus, by selecting the estimated available frequency spectrum resource under different distribution probabilities, a compromise can be made between the loss of the channel capacity of the secondary system and the reconfiguration complexity of the secondary system, thus it is able to select an optimal value according to actual requirements.

It should be understood by those skilled in the art that, the above method for determining the initial available spectrum resource of the secondary system is merely illustrative and not restrictive, and other methods can be used to determine the initial available spectrum resource of the secondary system.

Figure 8:
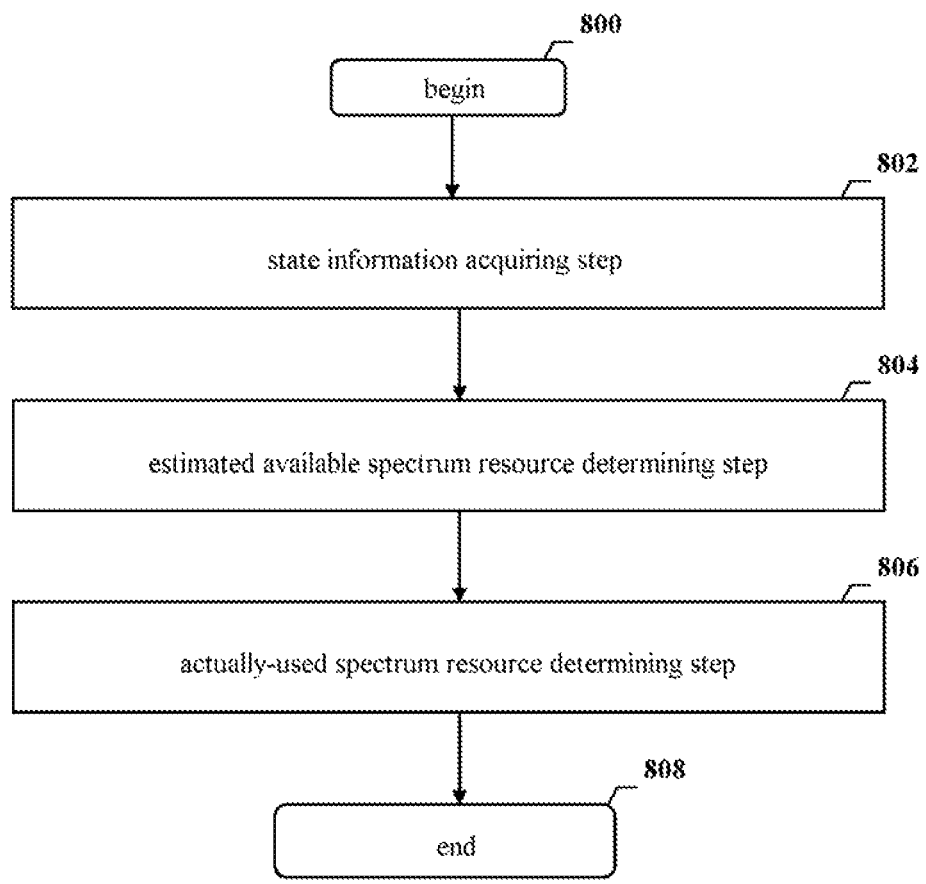
FIG. 8 is a flow chart of a method used in a wireless communication system according to an embodiment of the invention.

A method used in a wireless communication system according to an embodiment of the invention is described below with reference to FIG. 8. FIG. 8 is a flow chart of the method used in a wireless communication system according to the embodiment of the invention.

As shown in FIG. 8, the method begins at step 800. After step 800, the method proceeds to step 802.

Step 802 is a state information acquiring step. In step 802, state information of at least one of the secondary systems in a management region can be acquired when the state of at least one of the secondary systems in the management region changes.

After step 802, the method proceeds to step 804.

Step 804 is an estimated available spectrum resource determining step. In step 804, an estimated available spectrum resource of the secondary system can be determined according to the state information such that interference to a primary system from the secondary system does not exceed a predetermined range when the secondary system works in the range of the estimated available spectrum resource.

After step 804, the method proceeds to step 806.

Step 806 is an actually-used spectrum resource determining step. In step 806, the estimated available spectrum resource can be compared with an initial available spectrum resource before the changing of the state of at least one of the secondary systems, and an actually-used spectrum resource of the secondary system can be determined according to the comparison result.

The method shown in FIG. 8 is a method corresponding to the apparatus shown in FIG. 1, so the specific details will not be described here.

Figure 9:
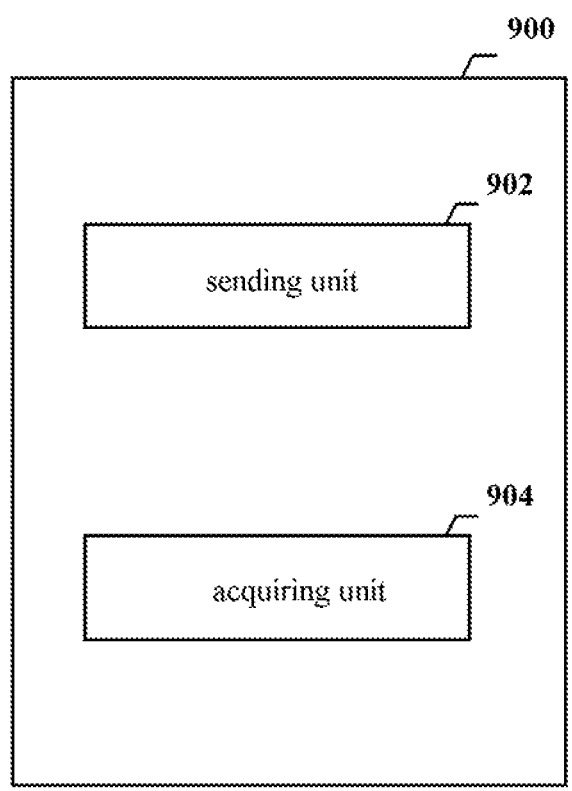
FIG. 9 is a block diagram illustrating the configuration of an apparatus in a wireless communication system according to another embodiment of the invention.

The configuration of an apparatus in a wireless communication system according to another embodiment of the invention is described below with reference to FIG. 9. FIG. 9 is a block diagram illustrating the configuration of the apparatus in a wireless communication system according to another embodiment of the invention.

As shown in FIG. 9, the apparatus 900 in a wireless communication system may include a sending unit 902 and an acquiring unit 904.

The sending unit 902 in the apparatus 900 can send state information of at least one of the secondary systems in a predetermined management region when the state of at least one of the secondary systems in the predetermined management region changes, wherein the state information is used to determine an estimated available spectrum resource of the secondary system such that the interference to a primary system from the secondary system does not exceed a predetermined range when the secondary system works in the range of the estimated available spectrum resource.

The acquiring unit 904 in the apparatus 900 can acquire an actually-used spectrum resource of the secondary system, wherein the actually-used spectrum resource is determined according to a comparison between the estimated available spectrum resource and an initial available spectrum resource before the changing of the state of at least one of the secondary systems.

According to a specific embodiment of the invention, the state information may include at least one of: position information of the secondary system, information of the number of secondary systems and system parameter information of the secondary system.

According to a specific embodiment of the invention, the acquiring unit 904 in the apparatus 900 can use the initial available spectrum resource as the actually-used spectrum resource if the estimated available spectrum resource is greater than or equal to the initial available spectrum resource. According to another specific embodiment of the invention, the acquiring unit 904 in the apparatus 900 can receive the estimated available spectrum resource and use the estimated available spectrum resource as the actually-used spectrum resource if the estimated available spectrum resource is less than the initial available spectrum resource.

Figure 10:
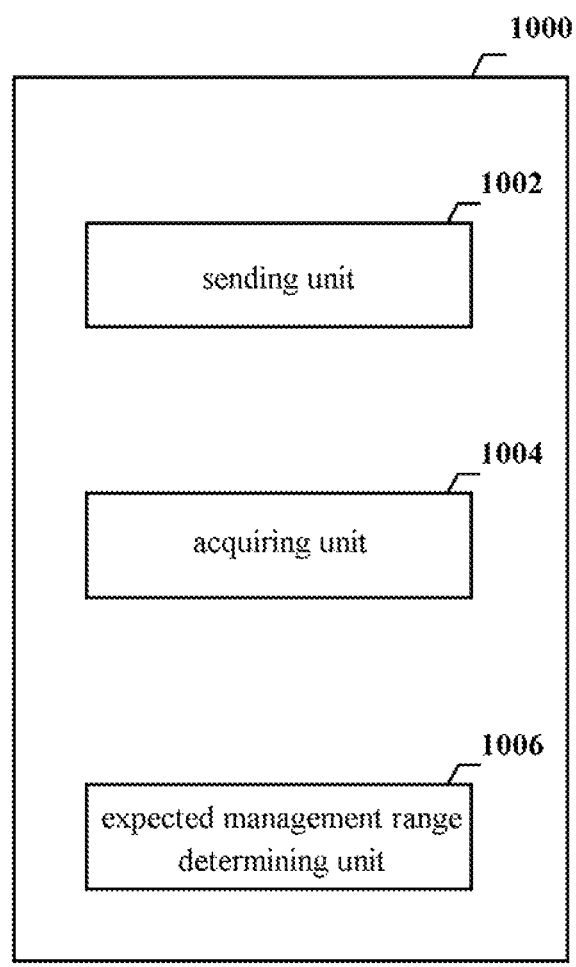
FIG. 10 is a block diagram illustrating the configuration of an apparatus in a wireless communication system according to another embodiment of the invention.

The configuration of an apparatus in a wireless communication system according to another embodiment of the invention is described below with reference to FIG. 10. FIG. 10 is a block diagram illustrating the configuration of the apparatus in a wireless communication system according to another embodiment of the invention.

As shown in FIG. 10, the apparatus 1000 in a wireless communication system includes a sending unit 1002, an acquiring unit 1004 and an expected management range determining unit 1006. Wherein the configurations of the sending unit 1002 and the acquiring unit 1004 are the same as that of the sending unit 902 and the acquiring unit 904 in the apparatus 900 shown in FIG. 9, so the specific details will not be described here. The expected management range determining unit 1006 in the apparatus 1000 is described below in detail.

As shown in FIG. 10, the expected management range determining unit 1006 in the apparatus 1000 can determine, according to the application and a predetermined moving direction of the secondary system or according to a normal moving range of the secondary system, the expected management range of the secondary system where the secondary system expects to use spectrum resources in a predetermined time period, and the sending unit 1002 in the apparatus 1000 can also send the expected management range, wherein the management region is obtained according to the expected management range.

According to a specific embodiment of the invention, the sending unit 1002 in the apparatus 1000 can also send at least one of the system type, the moving state and the air interface type of the secondary system, wherein the management region can also be obtained according to at least one of the system type, the moving state and the air interface type of the secondary system.

Figure 11:
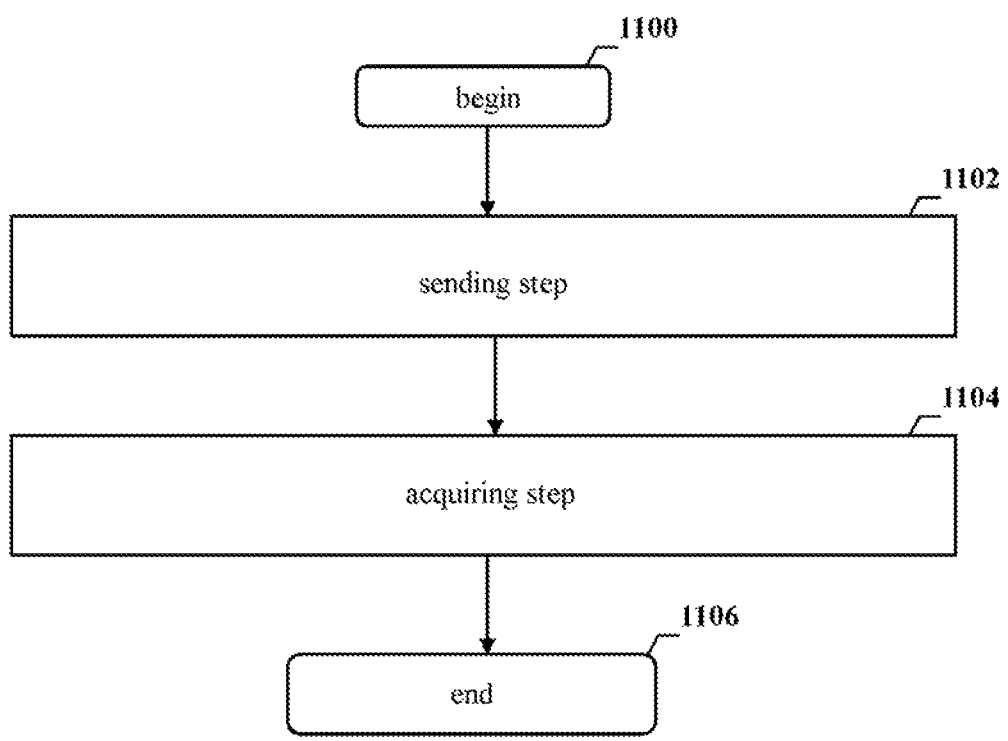
FIG. 11 is a flow chart of a method used in a wireless communication system according to another embodiment of the invention.

A method used in a wireless communication system according to another embodiment of the invention is described below with reference to FIG. 11. FIG. 11 is a flow chart of the method used in a wireless communication system according to another embodiment of the invention.

As shown in FIG. 11, the method begins at step 1100. After step 1100, the method proceeds to step 1102.

Step 1102 is a sending step. In step 1102, state information of at least one of the secondary systems in a predetermined management region is sent when the state of at least one of the secondary systems in the predetermined management region changes, wherein the state information is used to determine an estimated available spectrum resource of the secondary system such that interference to a primary system from the secondary system does not exceed a predetermined range when the secondary system works in the range of the estimated available spectrum resource.

After step 1102, the method proceeds to step 1104.

Step 1104 is an acquiring step. In step 1104, an actually-used spectrum resource of the secondary system can be obtained, wherein the actually-used spectrum resource is determined according to a comparison between the estimated available spectrum resource and an initial available spectrum resource before the changing of the state of at least one of the secondary systems.

The method shown in FIG. 11 is a method corresponding to the apparatus shown in FIG. 9, so the specific details will not be described here.

Figure 12:
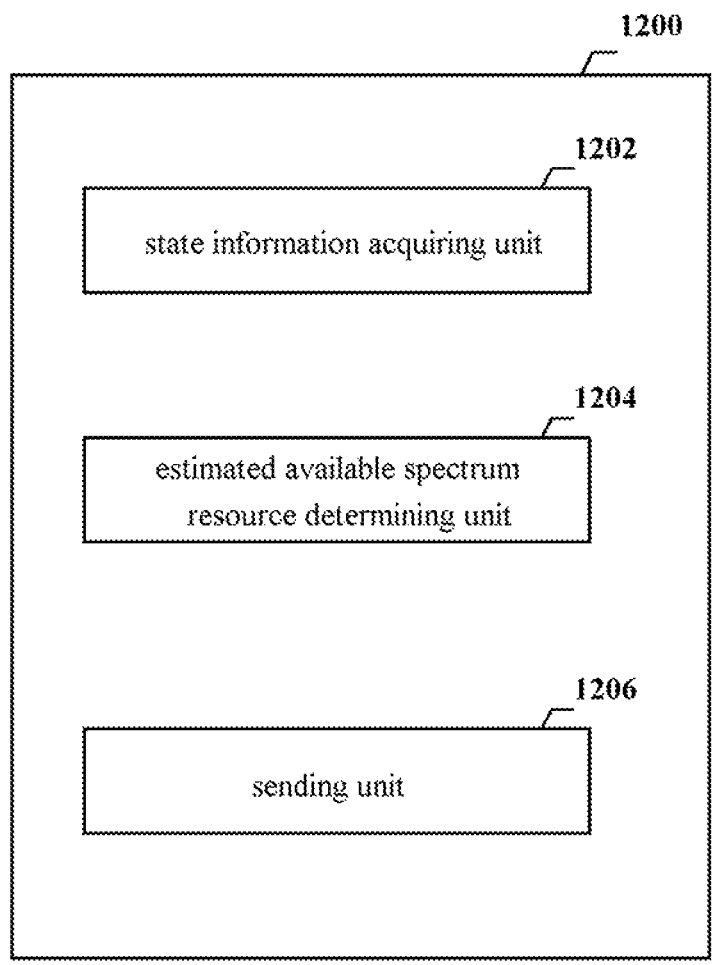
FIG. 12 is a block diagram illustrating the configuration of an apparatus in a wireless communication system according to another embodiment of the invention.

The configuration of an apparatus in a wireless communication system according to another embodiment of the invention is described below with reference to FIG. 12. FIG. 12 is a block diagram illustrating the configuration of the apparatus in a wireless communication system according to another embodiment of the invention.

As shown in FIG. 12, the apparatus 1200 in a wireless communication system may include a state information acquiring unit 1202, an estimated available spectrum resource determining unit 1204 and a sending unit 1206.

As shown in FIG. 12, the state information acquiring unit 1202 in the apparatus 1200 can acquire state information of at least one of the secondary systems in a predetermined management region when the state of at least one of the secondary systems in the predetermined management region changes.

Referring back to FIG. 12, the estimated available spectrum resource determining unit 1204 in the apparatus 1200 can determine an estimated available spectrum resource of the secondary system according to the state information such that the interference to a primary system from the secondary system does not exceed a predetermined range when the secondary system works in the range of the estimated available spectrum resource.

Referring back to FIG. 12, the sending unit 1206 in the apparatus 1200 can send the estimated available spectrum resource of the secondary system and an initial available spectrum resource before the changing of the state of at least one of the secondary systems to the secondary system in the management region, so that the secondary system compares the estimated available spectrum resource and the initial available spectrum resource and determines an actually-used spectrum resource of the secondary system according to the comparison result.

Figure 13:
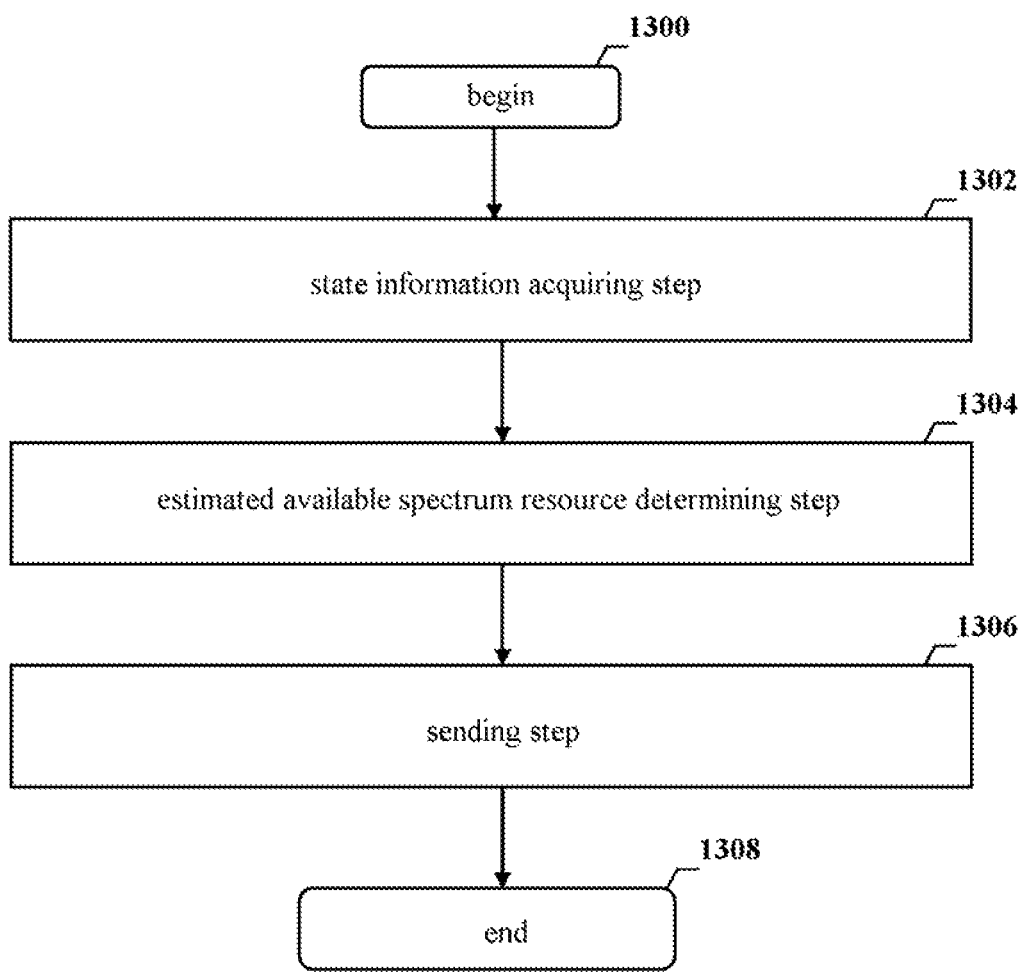
FIG. 13 is a flow chart of a method used in a wireless communication system according to another embodiment of the invention.

A method used in a wireless communication system according to another embodiment of the invention is described below with reference to FIG. 13. FIG. 13 is a flow chart of the method used in a wireless communication system according to another embodiment of the invention.

As shown in FIG. 13, the method begins at step 1300. After step 1300, the method proceeds to step 1302.

Step 1302 is a state information acquiring step. In step 1302, state information of at least one of the secondary systems in a predetermined management region is acquired when the state of at least one of the secondary systems in the predetermined management region changes.

After step 1302, the method proceeds to step 1304.

Step 1304 is an estimated available spectrum resource determining step. In step 1304, an estimated available spectrum resource of the secondary system can be acquired according to the state information such that interference to a primary system from the secondary system does not exceed a predetermined range when the secondary system works in the range of the estimated available spectrum resource.

After step 1304, the method proceeds to step 1306.

Step 1306 is a sending step. In step 1306, the estimated available spectrum resource of the secondary system and an initial available spectrum resource before the changing of the state of at least one of the secondary system can be sent to the secondary system in the management region, so that the secondary system compares the estimated available spectrum resource and the initial available spectrum resource and determines an actually-used spectrum resource according to the comparison result.

The method shown in FIG. 13 is a method corresponding to the apparatus show in FIG. 12, so the specific details will not be described here.

Figure 14:
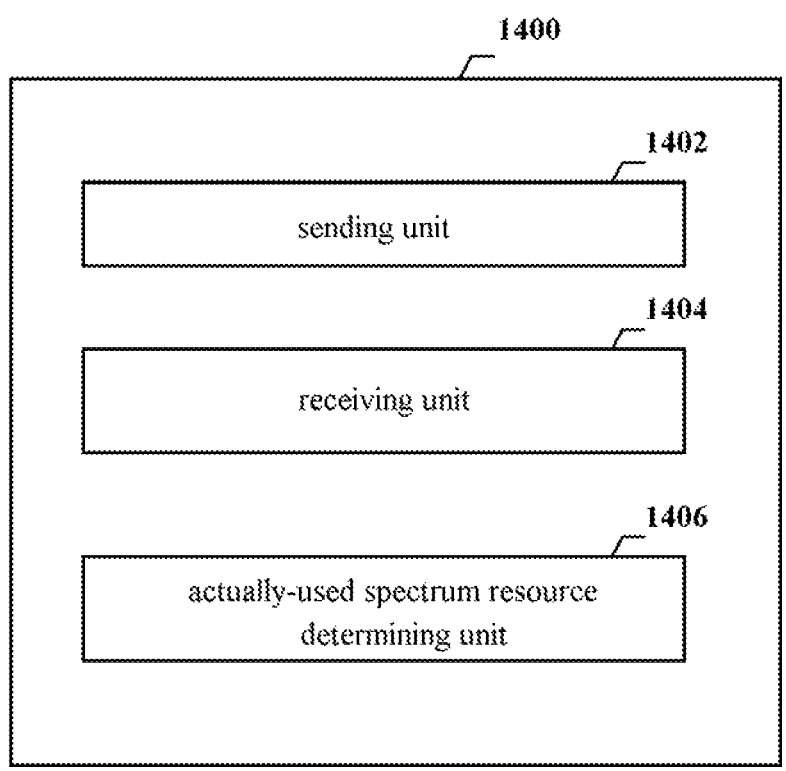
FIG. 14 is a block diagram illustrating the configuration of an apparatus in a wireless communication system according to another embodiment of the invention.

The configuration of an apparatus in a wireless communication system according to another embodiment of the invention is described with reference to FIG. 14. FIG. 14 is a block diagram illustrating the configuration of the apparatus in a wireless communication system according to another embodiment of the invention.

As shown in FIG. 14, the apparatus 1400 in a wireless communication system may include may include a sending unit 1402, a receiving unit 1404 and an actually-used spectrum resource determining unit 1406.

As shown in FIG. 14, the sending unit 1402 in the apparatus 1400 can send state information of at least one of the secondary systems in a predetermined management region when the state of at least one of the secondary systems in the predetermined management region changes, wherein the state information is used to determine an estimated available spectrum resource of the secondary system such that the interference to a primary system from the secondary system does not exceed a predetermined range when the secondary system works in the range in the estimated available spectrum resource.

Referring back to FIG. 14, the receiving unit 1404 in the apparatus 1400 can receive the estimated available spectrum resource of the secondary system and an initial available spectrum resource before the changing of the state of at least one of the secondary systems.

Referring back to FIG. 14, the actually-used spectrum resource determining unit 1406 in the apparatus 1400 can compare the estimated available spectrum resource with the initial available spectrum resource and determine an actually-used spectrum resource of the secondary system according to the comparison result.

Figure 15:
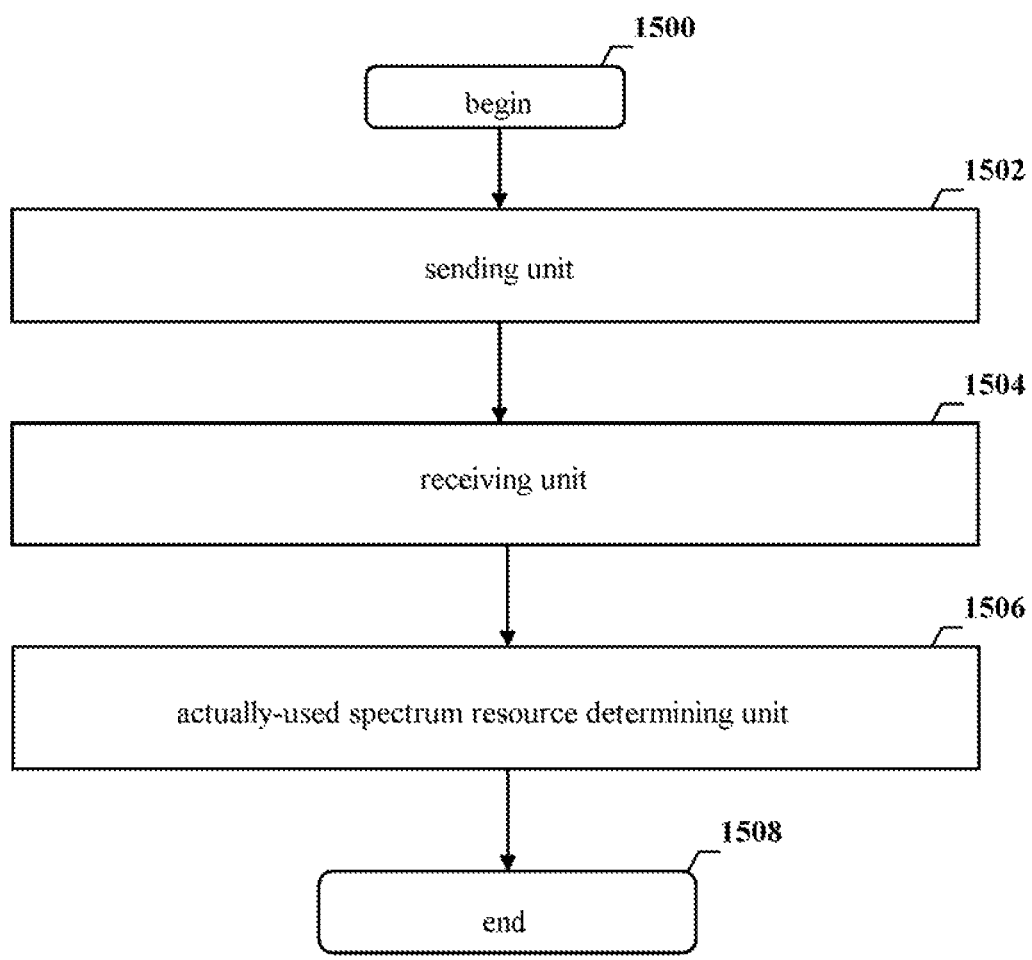
FIG. 15 is a flow chart of a method used in a wireless communication system according to another embodiment of the invention.

A method used in a wireless communication system according to another embodiment of the invention is described below with reference to FIG. 15. FIG. 15 is a flow chart of the method used in a wireless communication system according to another embodiment of the invention.

As shown in FIG. 15, the method begins at step 1500. After step 1500, the method proceeds to step 1502.

Step 1502 is a sending step. In step 1502, state information of at least one of the secondary systems in a predetermined management region can be sent when the state of at least one of the secondary systems in the predetermined management region changes, wherein the state information is used to determine an estimated available spectrum resource of the secondary system such that the interference to a primary system from the secondary system does not exceed a predetermined range when the secondary system works in the range of the estimated available spectrum resource.

In step 1502, the method proceeds to step 1504.

Step 1504 is a receiving step. In step 1504, the estimated available spectrum resource of the secondary system and the initial available spectrum resource before the changing of the state of at least one of the secondary systems can be received.

After step 1504, the method proceeds to step 1506.

Step 1506 is an actually-used spectrum resource determining step. In step 1506, the estimated available spectrum resource and the initial available spectrum resource can be compared and an actually-used spectrum resource can be determined according to the comparison result.

The method shown in FIG. 15 is a method corresponding to the apparatus shown in FIG. 14, so the specific details will not be described here.

Figure 16:
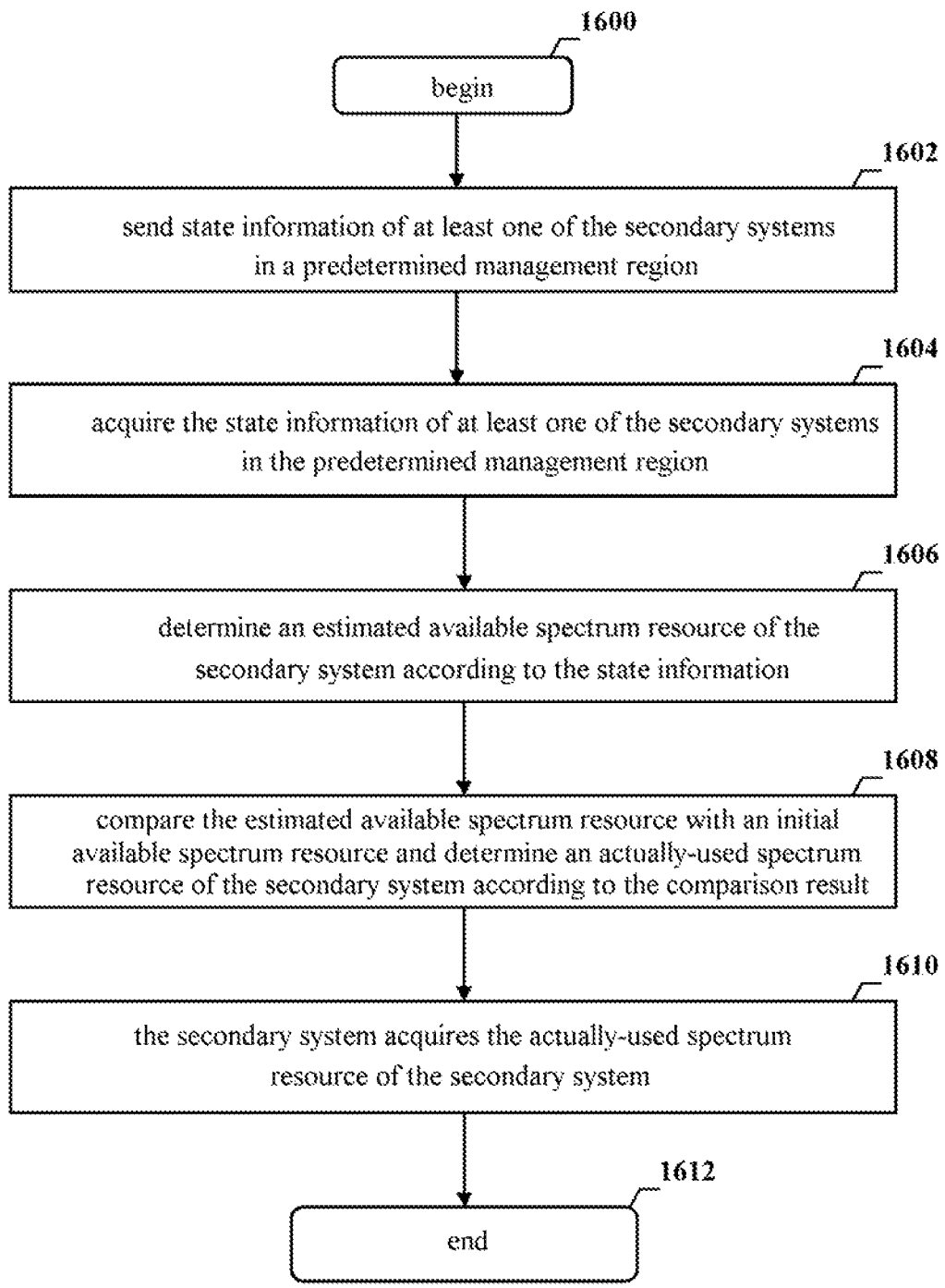
FIG. 16 is a flow chart of a method used in a wireless communication system according to another embodiment of the invention.

A method used in a wireless communication system according to another embodiment of the invention is described below with reference to FIG. 16. FIG. 16 is a flow chart of the method used in a wireless communication system according to another embodiment of the invention.

As shown in FIG. 16, the method begins at step 1600. After step 1600, the method proceeds to step 1602.

In step 1602, state information of at least one of the secondary systems in a predetermined management region can be sent when the state of at least one of the secondary systems in the predetermined management region changes.

After step 1602, the method proceeds to step 1604.

In step 1604, state information of at least one of the secondary systems in the predetermined management region can be acquired.

After step 1604, the method proceeds to step 1606.

In step 1606, an estimated available spectrum resource of the secondary system can be determined according to the state information such that interference to a primary system from the secondary system does not exceed a predetermined range when the secondary system works in the range of the estimated available spectrum resource.

After step 1606, the method proceeds to step 1608.

In step 1608, the estimated available spectrum resource can be compared with an initial available spectrum resource before the changing of the state of at least one of the secondary systems, and an actually-used spectrum resource of the secondary system can be obtained according to the comparison result.

After step 1608, the method proceeds to step 1610.

In step 1610, the secondary system acquires the actually-used spectrum resource of the secondary system.

Figure 17:
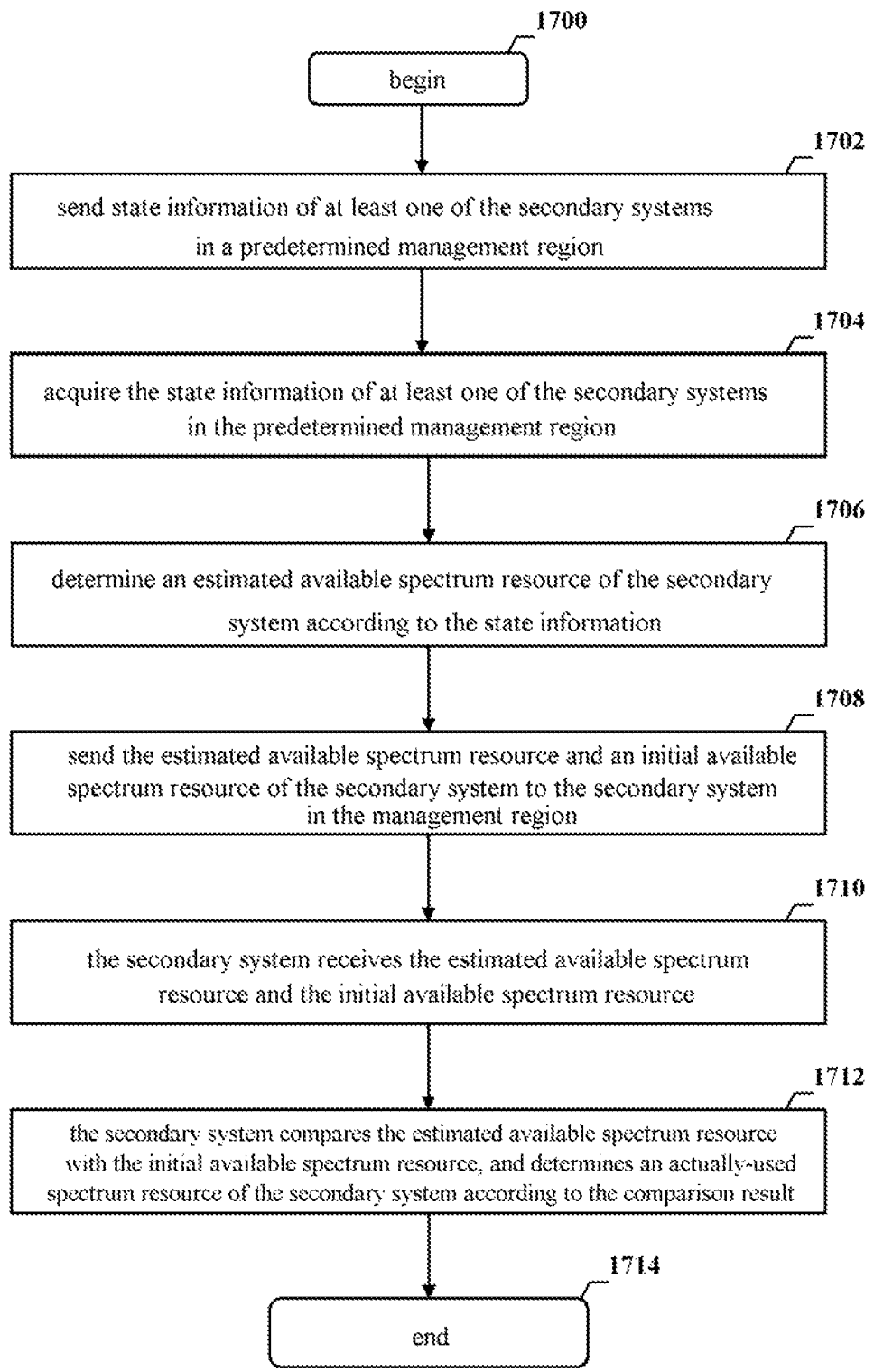
FIG. 17 is a flow chart of a method used in a wireless communication system according to another embodiment of the invention.

A method used in a wireless communication system according to another embodiment of the invention is described below with reference to FIG. 17. FIG. 17 is a flow chart of the method used in a wireless communication system according to another embodiment of the invention.

As shown in FIG. 17, the method begins at step 1700. After step 1700, the method proceeds to step 1702.

In step 1702, state information of at least one of the secondary systems in a predetermined management region can be sent when the state of at least one of the secondary systems in the predetermined management region changes.

After step 1702, the method proceeds to step 1704.

In step 1704, the state information of at least one of the secondary systems in the predetermined management region can be acquired.

After step 1704, the method proceeds to step 1706.

In step 1706, an estimated available spectrum resource of the secondary system can be determined according to the state information such that interference to a primary system from the secondary system does not exceed a predetermined range when the secondary system works in the range of the estimated available spectrum resource.

After step 1706, the method proceeds to step 1708.

In step 1708, the estimated available spectrum resource of the secondary system and an initial available spectrum resource before the changing of the state of at least one of the secondary systems can be sent to the secondary system in the predetermined management region.

After step 1708, the method proceeds to step 1710.

In step 1710, the secondary system can receive the estimated available spectrum resource of the secondary system and the initial available spectrum resource.

After step 1710, the method proceeds to step 1712.

In step 1712, the secondary system can compare the estimated available spectrum resource with the initial available spectrum resource and determine an actually-used spectrum resource according to the comparison result.

In addition, the embodiments of this application also provide a program product carrying machine-executable instructions which enable, when executed on an information processing device, the information processing device to execute the method used in a wireless communication system according to the embodiments of the invention described above.

In addition, the embodiments of this application also provide a storage medium including machine-readable program codes which enable, when executed on an information processing device, the information processing device to execute the method used in a wireless communication system according to the embodiments of the invention described above.

Accordingly, the storage medium for storing the program product carrying machine-readable instruction codes described above is also included in the disclosure of the invention. The storage medium includes but not limited to a floppy disk, an optical disk, a magneto-optical disk, a memory card, a memory stick and so on.

The apparatus in a wireless communication system according to the embodiments of the invention and its parts can be configured by software, firmware, hardware, or a combination thereof. Specific means for making this configuration are well known to those skilled in the art, which will not be described herein. In the case that the apparatus is implemented by software or firmware, programs constituting the software are installed into an information processing device having a specific hardware structure from a storage medium or a network (for example, the information processing device 1800 shown in FIG. 18), and when this information processing device is installed with various programs, the information processing device can execute various functions.

Figure 18:
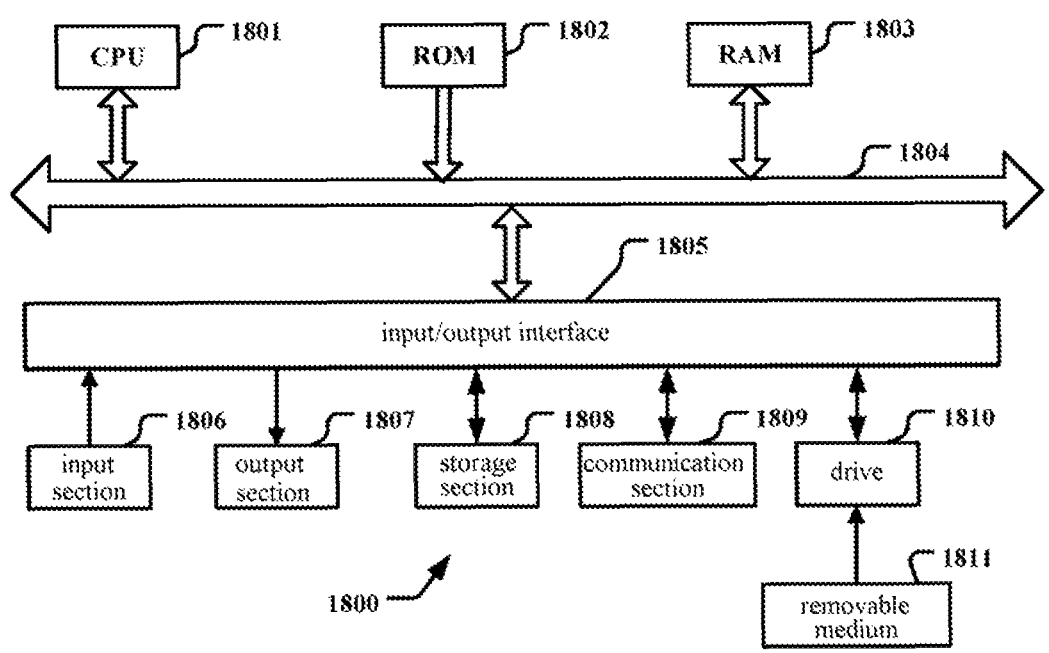
FIG. 18 is a schematic block diagram of an information processing device which can be used to implement the embodiments of the invention.

FIG. 18 is a schematic block diagram of an information processing device which can be used to implement the embodiments of the invention.

In FIG. 18, a central processing unit (CPU) 1801 executes various processing according to programs stored in a read only memory (ROM) 1802 or programs loaded into a random access memory (RAM) 1803 from a storage section 1808. The RAM 1803 also store data required when the CPU 1801 executes various processes. The CPU 1801, ROM 1802 and RAM 1803 are connected to each other via a bus 1804. An input/output interface 1805 is also connected to the bus 1804.

The following components are connected to the input/output interface 1805: an input section 1806 (including a keyboard, mouse, etc.), an output section 1807 (including a display, such as a cathode ray tube (CRT), a liquid crystal display (LCD), and a speaker etc.), a storage section 1808 (including a hard disk, etc.), a communication section 1809 (including a network interface cards such as a LAN card, a modem, etc.). The communication section 1809 executes communication processing via networks such as the Internet. According to needs, a drive 1810 can also be connected to the input/output interface 1805. According to needs, a removable media 1811 such as a magnetic disk, an optical disk, a magneto-optical disk, a semiconductor memory, can be installed in the drive 1810, so that a computer program read from therein is installed into the storage section 1808 as required.

In the case of achieving the above series of processing by software, the programs constituting the software are installed from the network such the internet or a storage medium such as the removable medium 1811.

Those skilled in the art should understand that the storage medium is not limited to the removable medium 1811 shown in FIG. 18 which stores a program and is distributed separately with the device to provide a program to a user. The example of the removable medium 1811 includes a magnetic disk (including a floppy disk (registered trademark)), an optical disk (including a compact disc read only memory (CD-ROM) and a digital versatile disk (DVD)), a magneto-optical disk (including a mini disc (MD) (registered trademark)) and a semiconductor memory. Alternatively, the storage medium may be the ROM 1802, a hard disk included in the storage section 1808, etc., which stores programs and is distributed to the user together with the device containing it.

When the instruction codes are read and executed by a machine, the method used in a wireless communication system according to the embodiments of the invention can be executed.

Obviously, for those skilled in the art, many variations and modifications can be made without departing from the scope and spirit of the invention. The selections and illustrations to the embodiments are merely for the purpose of explaining the principle and actual applications of the invention better, so that those skilled in the art can understand the invention fully. The invention can have various embodiments which are made with various changes in order to be suitable to specific purposes.

As to implementing manners including the above embodiments, the following annex are disclosed:

Annex:

1. An apparatus in a wireless communication system, comprising:

a state information acquiring unit configured to acquire state information of at least one secondary system of secondary systems in a predetermined management region when a state of the at least one secondary system of the secondary systems in the predetermined management region changes;

an estimated available spectrum resource determining unit configured to determine an estimated available spectrum resource of the secondary system according to the state information, such that interference to a primary system from the secondary system does not exceed a predetermined range when the secondary system works in the range of the estimated available spectrum resource; and an actually-used spectrum resource determining unit configured to compare the estimated available spectrum resource with an initial available spectrum resource before the changing of the state of the at least one of the secondary systems, and determine an actually-used spectrum resource of the secondary system according to comparison result.

2. The apparatus according to annex 1, wherein the state information comprises at least one of: position information of the secondary systems, information of the number of secondary systems, and system parameter information of the secondary systems.

3. The apparatus according to annex 1, wherein the actually-used spectrum resource determining unit is further configured to either instruct the secondary system to use the initial available spectrum resource as the actually-used spectrum resource or give no instruction, if the estimated available spectrum resource is greater than or equal to the initial available spectrum resource.

4. The apparatus according to annex 1, wherein the actually-used spectrum resource determining unit is further configured to send the estimated available spectrum resource to the secondary system if the estimated available spectrum resource is less than the initial available spectrum resource, such that the secondary system uses the estimated available spectrum resource as the actually-used spectrum resource.

5. The apparatus according to annex 1, further comprising: a management region determining unit configured to acquire an expected management range of the secondary system where the secondary system expects to use spectrum resources in a predetermined time period, and determine the management region according to the expected management range, wherein the expected management range is determined by the secondary system according to an application and a predetermined moving direction of the secondary system or according to a normal moving range of the secondary system.

6. The apparatus according to annex 5, wherein the management region determining unit is further configured to determine the management region according to at least one of a system type, a moving state and an air interface type of the secondary system.

7. The apparatus according to annex 1, further comprising: an initial available spectrum resource determining unit configured to determine, according to information of the secondary system and the primary system, respective estimated available spectrum resources of each secondary system in the management region at respective positions in the management region, and determine the initial available spectrum resource according to the respective estimated available spectrum resources at the respective positions.

8. The apparatus according to annex 7, wherein the initial available spectrum resource determining unit is further configured to calculate an average of the respective estimated available spectrum resources at the respective positions as the initial available spectrum resource.

9. The apparatus according to annex 7, wherein the initial available spectrum resource determining unit is further configured to count a distribution probability of the respective estimated available spectrum resources at the respective positions and a channel capacity when the estimated available spectrum resources under a corresponding distribution probability are used, and determine the initial available spectrum resource according to count result.

10. A method used in a wireless communication system, comprising:

a state information acquiring step, acquiring state information of at least one secondary system of secondary systems in a predetermined management region when a state of the at least one secondary system of the secondary systems in the predetermined management region changes;

an estimated available spectrum resource determining step, determining an estimated available spectrum resource of the secondary system according to the state information, such that interference to a primary system from the secondary system does not exceed a predetermined range when the secondary system works in the range of the estimated available spectrum resource; and an actually-used spectrum resource determining step, comparing the estimated available spectrum resource with an initial available spectrum resource before the changing of the state of the at least one secondary system of the secondary systems, and determining an actually-used spectrum resource of the secondary system according to comparison result.

11. An apparatus in a wireless communication system, comprising:
a sending unit configured to send state information of at least one secondary system of secondary systems in a predetermined management region when a state of the at least one secondary system of the secondary systems in the predetermined management region changes, wherein the state information is used to determine an estimated available spectrum resource of the secondary system such that interference to a primary system from the secondary system does not exceed a predetermined range when the secondary system works in the range of the estimated available spectrum resource; and
an acquiring unit configured to acquire an actually-used spectrum resource of the secondary system, wherein the actually-used spectrum resource is determined according to a comparison result of a comparison between the estimated available spectrum resource and an initial available spectrum resource before the changing of the state of the at least one secondary system of secondary systems.

12. The apparatus according to annex 11, wherein the state information comprises at least one of: position information of the secondary systems, information of the number of secondary systems and system parameter information of the secondary systems.

13. The apparatus according to annex 11, wherein the acquiring unit is further configured to use the initial available spectrum resource as the actually-used spectrum resource if the estimated available spectrum resource is greater than or equal to the initial available spectrum resource.

14. The apparatus according to annex 11, the acquiring unit is further configured to receive the estimated available spectrum resource and use the estimated available spectrum resource as the actually-used spectrum resource, if the estimated available spectrum resource is less than the initial available spectrum resource.

15. The apparatus according to annex 11, further comprising: an expected management range determining unit configured to determine, according to an application and a predetermined moving direction of the secondary system or according to a normal moving range of the secondary system, an expected management range of the secondary system where the secondary system expects to use spectrum resources in a predetermined time period, wherein the sending unit is further configured to send the expected management range and the management region is obtained according to the expected management range.

16. The apparatus according to annex 15, wherein the sending unit is further configured to send at least one of a system type, a moving state and an air interface type of the secondary system, wherein the management region is further obtained according to at least one of the system type, the moving state and the air interface type of the secondary system.

17. A method used in a wireless communication system, comprising:
a sending step, sending state information of at least one secondary system of secondary systems in a predetermined management region when a state of the at least one secondary system of the secondary systems in the predetermined management region changes, wherein the state information is used to determine an estimated available spectrum resource of the secondary system such that interference to a primary system from the secondary system does not exceed a predetermined range when the secondary system works in the range of the estimated available spectrum resource; and
an acquiring step, acquiring an actually-used spectrum resource of the secondary system, wherein the actually-used spectrum resource is determined according to a comparison result of a comparison between the estimated available spectrum resource and an initial available spectrum resource before the changing of the state of the at least one secondary system of secondary systems.

18. An apparatus in a wireless communication system, comprising:
a state information acquiring unit configured to acquire state information of at least one secondary system of secondary systems in a predetermined management region when a state of the at least one secondary system of the secondary systems in the predetermined management region changes;
an estimated available spectrum resource determining unit configured to determine an estimated available spectrum resource of the secondary system according to the state information, such that interference to a primary system from the secondary system does not exceed a predetermined range when the secondary system works in the range of the estimated available spectrum resource; and
a sending unit configured to send the estimated available spectrum resource of the secondary system and the initial available spectrum resource before the changing of the state of the at least one secondary system of secondary systems to the secondary system in the management region, such that the secondary system compares the estimated available spectrum resource with the initial available spectrum resource and determines an actually-used spectrum resource of the secondary system according to comparison result.

19. A method used in a wireless communication system, comprising:
a state information acquiring step, acquiring state information of at least one secondary system of secondary systems in a predetermined management region when a state of the at least one secondary system of the secondary systems in the predetermined management region changes;
an estimated available spectrum resource determining step, determining an estimated available spectrum resource of the secondary system according to the state information such that interference to a primary system from the secondary system does not exceed a predetermined range when the secondary system works in the range of the estimated available spectrum resource; and
a sending step, sending the estimated available spectrum resource of the secondary system and an initial available spectrum resource before the changing of the state of the at least one secondary system of secondary systems to the secondary system in the management region, such that the secondary system compares the estimated available spectrum resource with the initial available spectrum resource and determines an actually-used spectrum resource of the secondary system according to comparison result.

20. An apparatus in a wireless communication system, comprising:
a sending unit configured to send state information of at least one secondary system of secondary systems in a predetermined management region when a state of the at least one secondary system of the secondary systems in the predetermined management region changes, wherein the state information is used to determine an estimated available spectrum resource of the secondary system such that interference to a primary system from the secondary system does not exceed a predetermined range when the secondary system works in the range of the estimated available spectrum resource;

a receiving unit configured to receive the estimated available spectrum resource of the secondary system and an initial available spectrum resource before the changing of the state of the at least one secondary system of secondary systems; and an actually-used spectrum resource determining unit configured to compare the estimated available spectrum resource with the initial available spectrum resource and determine an actually-used spectrum resource of the secondary system according to comparison result.

21. A method used in a wireless communication system, comprising:

a sending step, sending state information of at least one secondary system of secondary systems in a predetermined management region when a state of the at least one secondary system of the secondary systems in the predetermined management region changes, wherein the state information is used to determine an estimated available spectrum resource of the secondary system such that interference to a primary system from the secondary system does not exceed a predetermined range when the secondary system works in the range of the estimated available spectrum resource;

a receiving step, receiving the estimated available spectrum resource of the secondary system and an initial available spectrum resource before the changing of the state of the at least one secondary system of secondary systems; and an actually-used spectrum resource determining step, comparing the estimated available spectrum resource with the initial available spectrum resource, and determining an actually-used spectrum resource of the secondary system according to comparison result.

The invention claimed is:

1. A system, comprising;
circuitry, configured to
    obtain state information of one or more secondary systems managed by the system in a management region;
    determine first radio resources of a primary system available for the secondary systems based on the state information and allow the secondary systems to use the first radio resources;
    identify a change of the state information;
    determine second radio resources of the primary system available for the secondary systems based on the change; and
    request the secondary systems to use the second radio resources if the second radio resources is smaller than the first radio resources.

2. The system according to claim 1, wherein the circuitry is further configured to not to request the secondary systems to use the second radio resources if the second radio resources is larger than the first radio resources.

3. The system according to claim 2, wherein the circuitry is further configured to indicate the secondary systems to use the first radio resources if the second radio resources is larger than the first radio resources.

4. The system according to claim 1, wherein the state information comprises at least one of: location information of the secondary systems, information of the number of secondary systems, and system parameter information of the secondary systems.

5. The system according to claim 1, wherein the state information of the secondary systems comprises operating regions of the secondary systems, or at least one of a system type, a moving state and an air interface type of the secondary systems, and the circuitry is configured to determine the management region based on the state information.

6. The system according to claim 1, wherein the circuitry is configured to determine radio resources available to the secondary systems for different positions in the management region, and determine the first radio resources based on the radio resources available to the secondary systems for different positions in the management region.

7. The system according to claim 1, wherein the system comprises a database.

8. The system according to claim 1, wherein the system comprises the primary system.

9. A method for a system, comprising:
    obtaining state information of one or more secondary systems managed by the system in a management region;
    determining first radio resources of a primary system available for the secondary systems based on the state information and allow the secondary systems to use the first radio resources;
    identifying a change of the state information;
    determining second radio resources of the primary system available for the secondary systems based on the change; and
    requesting the secondary systems to use the second radio resources if the second radio resources is smaller than the first radio resources.

10. A system, comprising:
circuitry, configured to
    provide state information of the system to a device managing the system;
    receive first radio resources of a primary system available for the system from the device;
    receive second radio resources of the primary system available for the system from the device after receiving the first radio resources;
    use the second radio resources if second radio resources is smaller than the first radio resources.

11. The system according to claim 10, wherein the circuitry is further configured to not to use the second radio resources if the second radio resources is larger than the first radio resources.

12. The system according to claim 11, wherein the circuitry is further configured to use the first radio resources if the second radio resources is larger than the first radio resources.

13. The system according to claim 10, wherein the state information comprises at least one of: location information of the system, information of the on/off state of the system, and system parameter information of the system.

14. The system according to claim 1, wherein the state information comprises an operating region of the system or at least one of a system type, a moving state and an air interface type of the system.

15. A method for a system, comprising:
    providing state information of the system to a device managing the system;
    receiving first radio resources of a primary system available for the system from the device;
    receiving second radio resources of the primary system available for the system from the device after receiving the first radio resources;
    using the second radio resources if second radio resources is smaller than the first radio resources.

16. A non-transient computer readable medium in a system comprising computer-executable instructions for performing:

obtaining state information of one or more secondary systems managed by the system in a management region;

determining first radio resources of a primary system available for the secondary systems based on the state information and allow the secondary systems to use the first radio resources;

identifying a change of the state information;

determining second radio resources of the primary system available for the secondary systems based on the change; and requesting the secondary systems to use the second radio resources if the second radio resources is smaller than the first radio resources.

17. A non-transient computer readable medium in a system comprising computer-executable instructions for performing:

providing state information of the system to a device managing the system;

receiving first radio resources of a primary system available for the system from the device;

receiving second radio resources of the primary system available for the system from the device after receiving the first radio resources;

using the second radio resources if second radio resources is smaller than the first radio resources.

* * * * *